(12) United States Patent
Nakamura et al.

(10) Patent No.: US 11,361,632 B2
(45) Date of Patent: Jun. 14, 2022

(54) HAPTIC INFORMATION PRESENTATION SYSTEM

(71) Applicant: Murata Manufacturing Co., Ltd., Kyoto (JP)

(72) Inventors: Norio Nakamura, Ibaraki (JP); Natsuo Koda, Ibaraki (JP); Yosuke Iizuka, Ibaraki (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 16/215,974

(22) Filed: Dec. 11, 2018

(65) Prior Publication Data

US 2019/0108732 A1 Apr. 11, 2019

Related U.S. Application Data

(62) Division of application No. 15/285,059, filed on Oct. 4, 2016, now abandoned.

(30) Foreign Application Priority Data

Oct. 5, 2015 (JP) .................................. 2015-208386

(51) Int. Cl.
*G06F 3/0346* (2013.01)
*G08B 6/00* (2006.01)
*G06F 3/0354* (2013.01)
*G06F 3/01* (2006.01)

(52) U.S. Cl.
CPC .............. *G08B 6/00* (2013.01); *G06F 3/016* (2013.01); *G06F 3/0346* (2013.01); *G06F 3/03542* (2013.01)

(58) Field of Classification Search
USPC ....................................................... 340/407.1
See application file for complete search history.

(56) References Cited

U.S. PATENT DOCUMENTS

| 7,967,679 B2* | 6/2011 | Ombrellaro ........... A63F 13/285 463/30 |
| 9,552,707 B1* | 1/2017 | Bala ......................... G08B 6/00 |
| 9,710,064 B2 | 7/2017 | Grant |
| 2010/0045612 A1 | 2/2010 | Molne |
| 2010/0245237 A1 | 9/2010 | Nakamura |
| 2011/0276878 A1 | 11/2011 | Sormunen |

(Continued)

FOREIGN PATENT DOCUMENTS

| JP | 2007-041895 A | 2/2007 |
| JP | 2012-221387 A | 11/2012 |

(Continued)

OTHER PUBLICATIONS

Japanese Office Action mailed in Japanese Application No. JP2020-068563 dated May 18, 2021, 5 pages.

(Continued)

*Primary Examiner* — Brent Swarthout

(57) ABSTRACT

A tactile force information presenting system includes: a tactile force presenting device that generates the stimulus; a drive device that drives the tactile force presenting device; and a tactile force non-presenting device that does not generate said stimulus to an operator, and the tactile force presenting device presents the tactile force to the operator.

17 Claims, 32 Drawing Sheets

(56) References Cited

U.S. PATENT DOCUMENTS

| | | | |
|---|---|---|---|
| 2012/0086564 A1* | 4/2012 | Sinha | H04M 1/23 340/407.1 |
| 2016/0009317 A1 | 1/2016 | Evreinov | |
| 2016/0103489 A1 | 4/2016 | Cruz-Hernandez | |
| 2017/0177083 A1 | 6/2017 | Alghooneh | |
| 2018/0004310 A1 | 1/2018 | Drum | |
| 2018/0369064 A1* | 12/2018 | Baxter | A61F 7/10 |
| 2020/0209975 A1* | 7/2020 | Eagleman | G10L 21/16 |

FOREIGN PATENT DOCUMENTS

| | | |
|---|---|---|
| JP | 2015-170213 A | 9/2015 |
| JP | 2017-073100 A | 4/2017 |

OTHER PUBLICATIONS

Japanese Office Action mailed in Japanese Application No. JP2020-041053 dated Jun. 30, 2021, 4 pages.
Japanese Office Action mailed in Japanese Application No. JP2020-068563 dated Oct. 18, 2021, 2 pages.

* cited by examiner

Fixed portion

Stimulus presentation portion

■ Stick form

FIG. 17
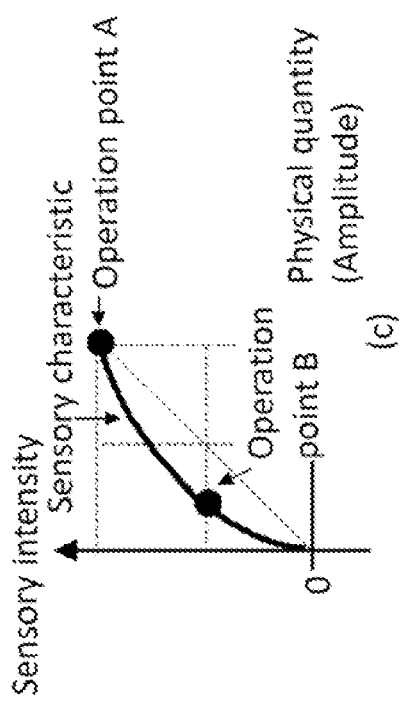
(a) Twin eccentric rotor
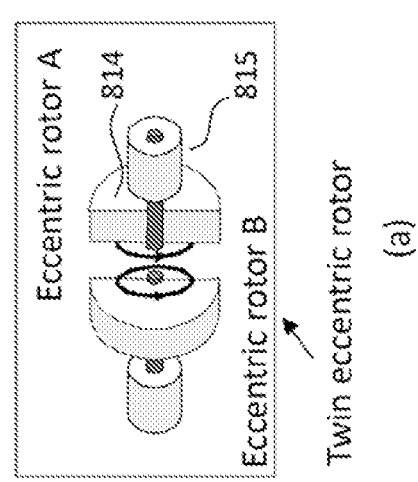
(b) Phase relationship in force presenting twin eccentric rotor
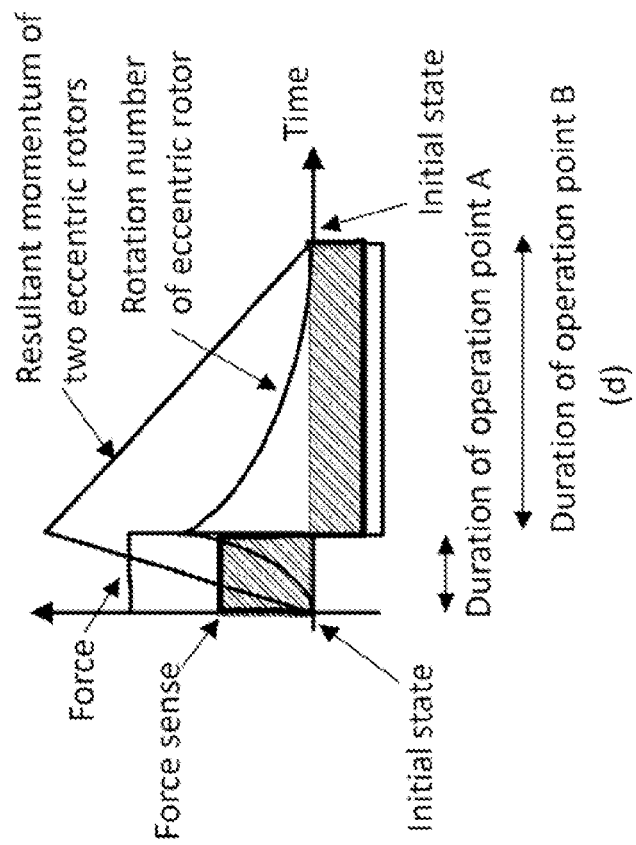
(c)
(d)

HAPTIC INFORMATION PRESENTATION SYSTEM

CROSS-REFERENCE TO RELATED APPLICATIONS

This application is a divisional of U.S. patent application Ser. No. 15/285,059, filed on Oct. 4, 2016, entitled HAPTIC INFORMATION PRESENTATION SYSTEM, which claims the benefit of Japanese Patent Application Serial No. 2015-208386, filed on Oct. 5, 2015, both of which are hereby incorporated herein by reference.

FIELD OF THE INVENTION

The invention relates to a tactile force information presenting system that uses a sensory characteristic.

BACKGROUND

In a conventional tactile force electronic device, a portion held by a user and a portion generating a vibration stimulus are configured integrally. The vibration stimulus is transmitted to the user from the entire tactile force electronic device.

SUMMARY

The invention has been made in order to overcome such a drawback that, due to heavy weight of the conventional electronic device, only the slight vibration stimulus is transmitted to an operator, which prevents reliable transmission of the vibration stimulus. Therefore, the invention has a purpose of reliably and accurately providing even a slight vibration stimulus to a user regardless of weight of an electronic device.

A tactile force information presenting system includes:

a sensor that detects a stimulus including at least one of displacement, deformation, pressure, rotation, acceleration, vibration, humidity, and temperature;

a tactile force presenting device, to which a sensory characteristic and/or a sensory illusion of an operator is applied, so as to present a tactile force to said operator as if he/she actually operates the device; and a tactile force presentation controller that controls the tactile force presenting device on the basis of the stimulus from the sensor.

The tactile force presentation controller uses such a fact that the sensory characteristic, which indicates a relationship between a quantity of stimulus applied to a human body and a sensory quantity, is nonlinear and/or the sensory illusion, so as to control the quantity of stimulus and present tactile force information, the sensory characteristic includes: at least one of the quantity of stimulus that is provided to the operator and the quantity of stimulus that is generated through an operation by the operator; and the sensory quantity that is presented to the operator, said sensory quantity being a sensory quantity that cannot exist physically, and the tactile force information presenting system includes: the tactile force presenting device that generates the stimulus; a drive device that drives the tactile force presenting device; and a tactile force non-presenting device that does not generate said stimulus to the operator, said tactile force presenting device presenting said tactile force to the operator.

In the above tactile force information presenting system, the tactile force presenting device and the tactile force non-presenting device are attached to each other via a tactile force presentation separating device that prevents transmission of the tactile force to the tactile force non-presenting device.

In the above tactile force information presenting system, the tactile force presenting device includes a vibration member and presents the tactile force to the operator via an opening that is provided in said tactile force presenting device.

The invention can reliably and accurately provide even a slight vibration stimulus to the user regardless of weight of an electronic device.

BRIEF DESCRIPTION OF THE DRAWINGS

FIG. 17 is schematic views illustrating a method for controlling an actuator.

DETAILED DESCRIPTION OF THE INVENTION

A tactile force information presenting system includes:

a sensor that detects a stimulus including at least one of displacement, deformation, pressure, rotation, acceleration, a vibration, a humidity, and a temperature;

a tactile force presenting device, to which a sensory characteristic and/or a sensory illusion of an operator is applied, so as to present a tactile force to said operator as if he/she actually operates the device; and a tactile force presentation controller that controls the tactile force presenting device on the basis of the stimulus from the sensor.

The tactile force presentation controller uses such a fact that the sensory characteristic, which indicates a relationship between a quantity of stimulus applied to a human body and a sensory quantity, is nonlinear and/or the sensory illusion, so as to control the quantity of stimulus and present the tactile force information.

The tactile force presenting device presents said tactile force to the operator. The sensory characteristic includes: at least one of the quantity of stimulus that is provided to the operator and the quantity of stimulus that is generated through the operation by the operator; and the sensory quantity that is presented to the operator. Said sensory quantity is a sensory quantity that cannot exist physically.

The tactile force information presenting system includes: the tactile force presenting device that generates the stimulus; a drive device that drives the tactile force presenting device; and a tactile force non-presenting device that does not generate said stimulus to the operator.

In the above tactile force information presenting system, the tactile force presenting device and the tactile force non-presenting device are attached to each other via a tactile force presentation separating device that prevents transmission of the tactile force to the tactile force non-presenting device.

In the above tactile force information presenting system, the tactile force presenting device includes a vibration member and presents the tactile force to the operator via an opening that is provided in said tactile force presenting device.

Figure 1:
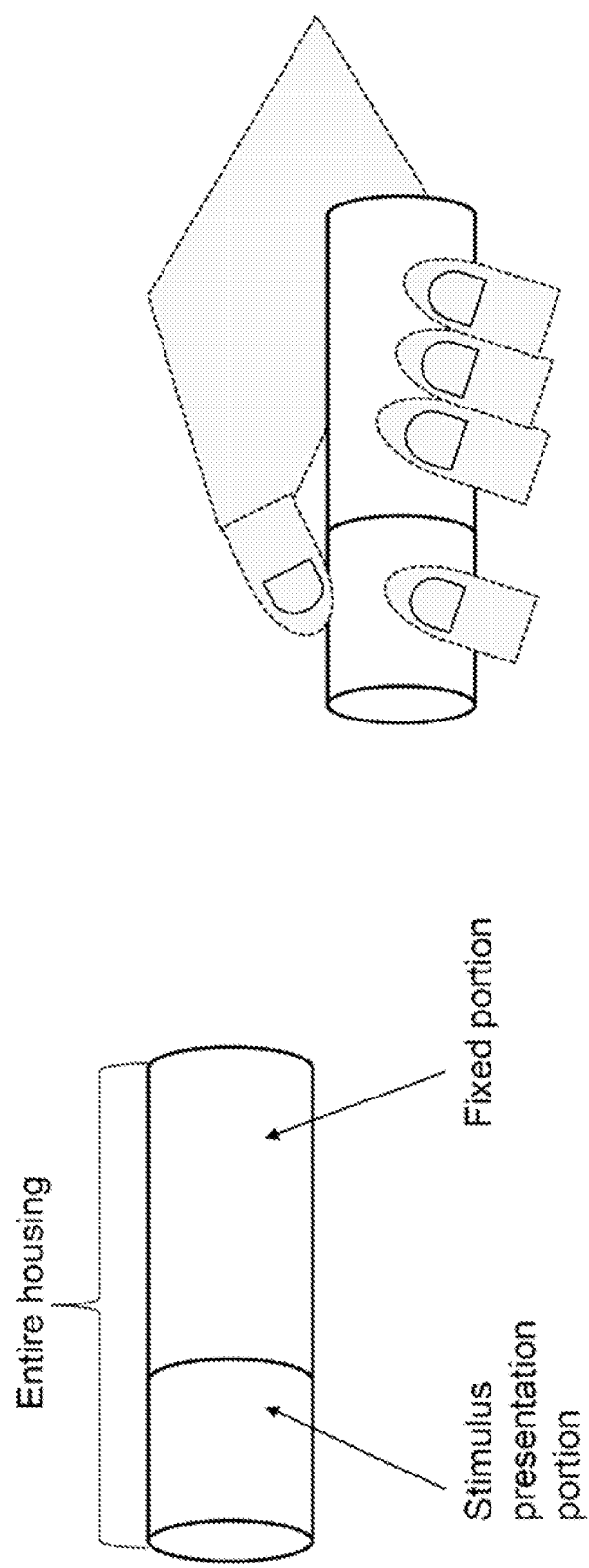
FIG. 1 is a schematic view that shows separation of a fixed section and a stimulus presenting section.
Figure 2:
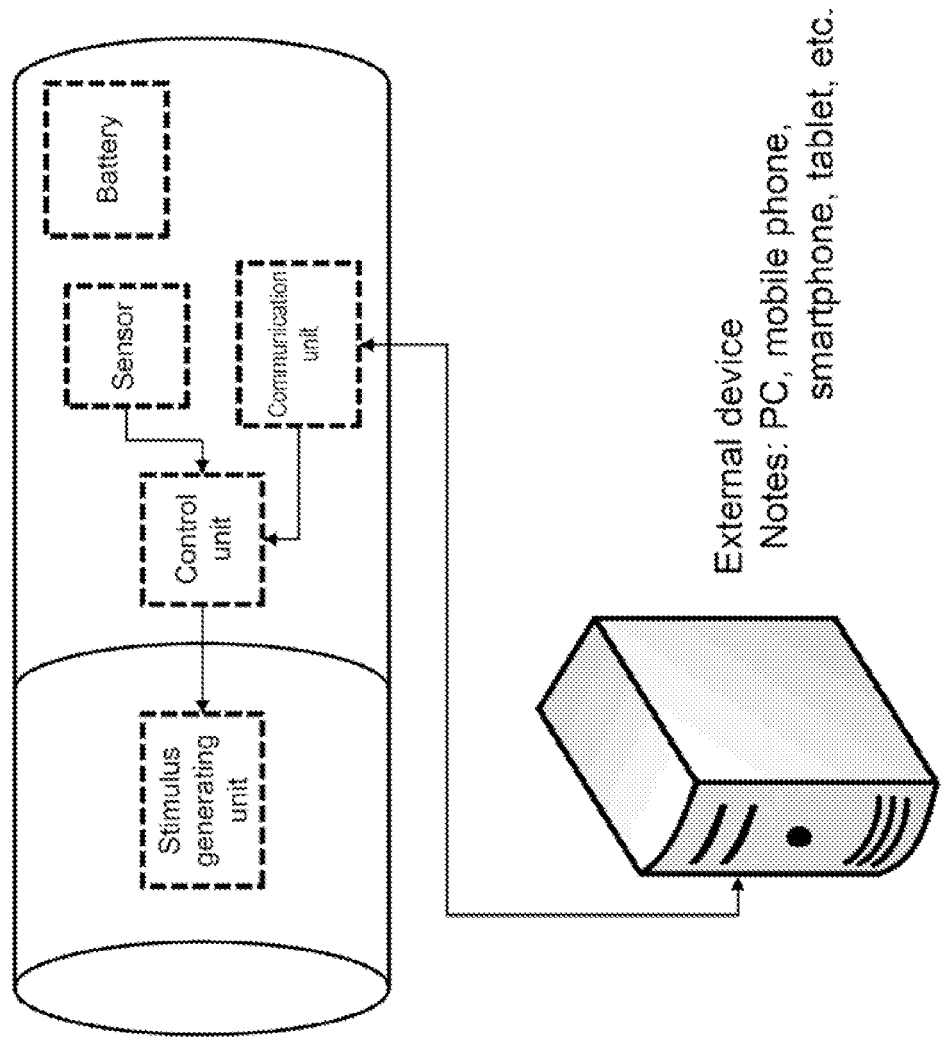
FIG. 2 is a schematic view of a system.
Figure 3:
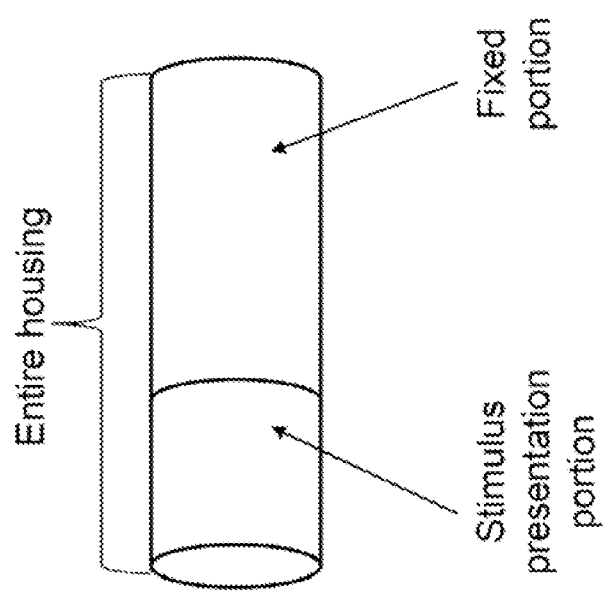
FIG. 3 is a schematic view that shows types of stimuli presented by the stimulus presenting section.

FIG. 1 shows a tactile force information presenting system according to the invention.

The tactile force information presenting system includes, in a casing: a tactile force presenting device that generates a stimulus; a drive device that drives the tactile force presenting device; and a tactile force non-presenting device that does not generate the stimulus to an operator.

The tactile force presenting device, which generates the stimulus, includes at least one of an eccentric motor as a vibration source, an ultrasonic wave such as an actuator, a piezoelectric element, a piezo element, a speaker, or the like, and an electric stimulus.

The tactile force presenting device includes a stimulus presenting section. The tactile force non-presenting device includes a fixed section that is held by a user or attached to a desk or the like. The tactile force presentation controller is installed in the tactile force non-presenting device. The tactile force presentation controller controls the tactile force presenting device on the basis of a stimulus from a sensor. In addition to the sensor, the tactile force presentation controller includes a communication device, a power supply, a control circuit, and the like.

The fixed section is placed on a palm, grasped by fingers, and thereby fixed.

In this way, the tactile force presenting device can provide a vibration stimulus to a thumb and an index finger even when the casing is partially fixed by the palm.

The tactile force presentation controller generates a stimulus pattern by using position information, posture information, or the like from the sensor. The tactile force presentation controller generates the stimulus from the calculated stimulus pattern. The tactile force presentation controller can also calculate the stimulus pattern in cooperation with external equipment through the communication device.

Figure 4:
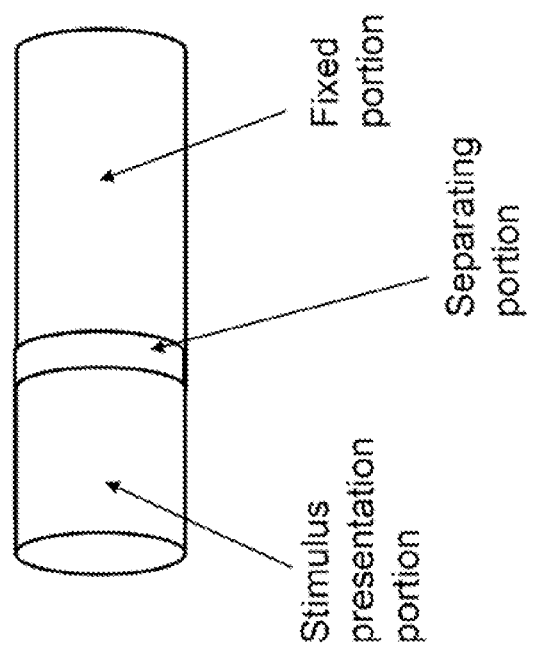
FIG. 4 is a schematic view that shows a separation method of the stimulus presenting section and the fixed section.

As shown in FIG. 4, the above tactile force information presenting system includes the tactile force presentation separating device at a position between the tactile force presenting device and the tactile force non-presenting device. The tactile force presentation separating device prevents transmission of the tactile force, such as the vibration, from the tactile force presenting device to the tactile force non-presenting device. The tactile force presentation separating device is preferably a member that absorbs the stimulus or a separating device.

In a case of the vibration, rubber, sponge, a spring, gel, or the like is used as a material that absorbs the vibration. In a case of the ultrasonic wave, the rubber, the sponge, the spring, the gel, or the like is used as a material that absorbs the ultrasonic wave. In a case of the electric stimulus, an insulator or the like is used.

The tactile force presenting device includes the stimulus presenting section. The stimulus presenting section is shown in FIG. 5 to FIG. 11. In these drawings, a vibration body is disposed in the stimulus presenting section via an opening. The opening is provided on at least one of an upper side and a lower side of the stimulus presenting section. Alternatively, the plural openings are provided on each of the upper side and the lower side of the stimulus presenting section.

The vibration body transmits the vibration stimulus to the user via the opening. The vibration body is disposed in a freely movable manner in the stimulus presenting section. The vibration body is disposed in a manner to vibrate independently from the stimulus presenting section. The vibration body is in low-friction contact with an inner surface of the stimulus presenting section. Even when the fixed section is fixed by another portion of the human body or fixed to the desk or the like, the vibration body vibrates freely, and the vibration is transmitted to a fingertip or the like.

Figure 5:
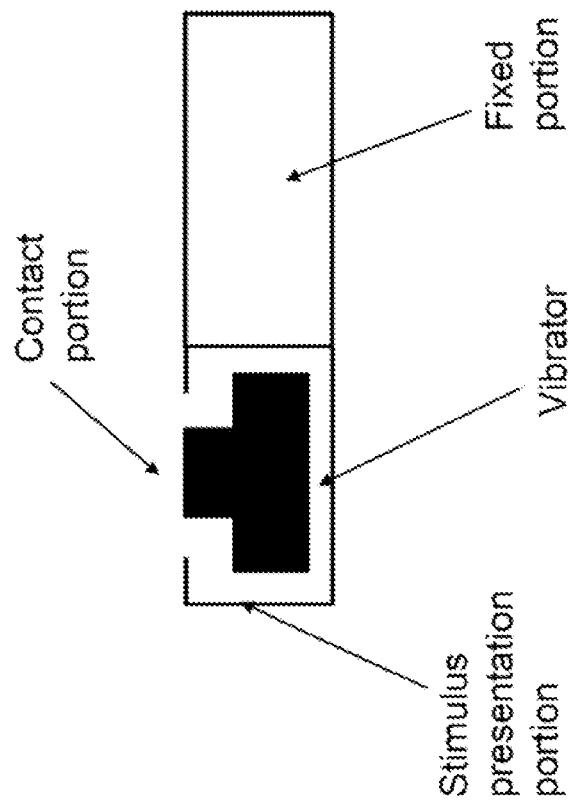
FIG. 5 is a schematic view that shows another separation method of the stimulus presenting section and the fixed section.
Figure 6:
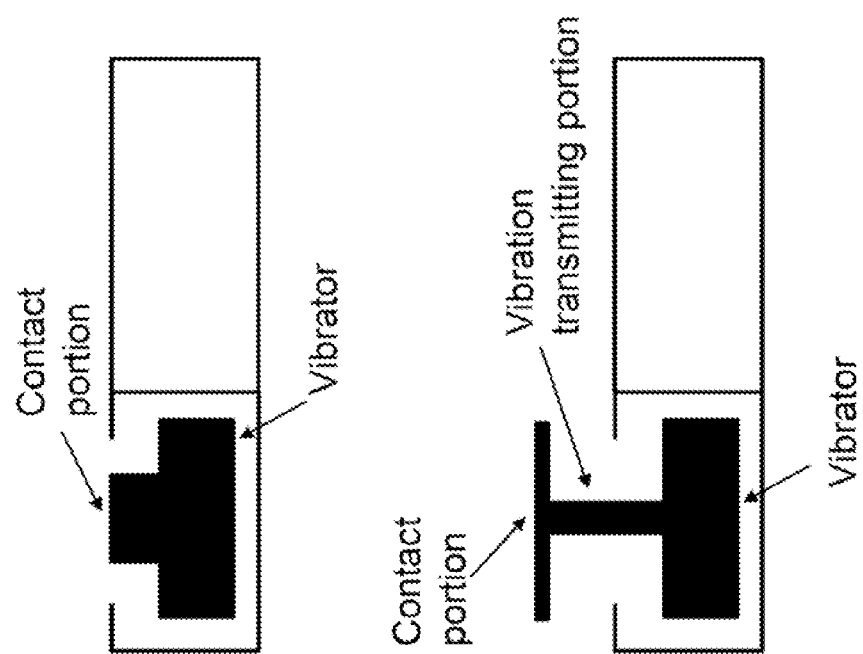
FIG. 6 includes schematic views, each of which shows a contact portion.
Figure 7:
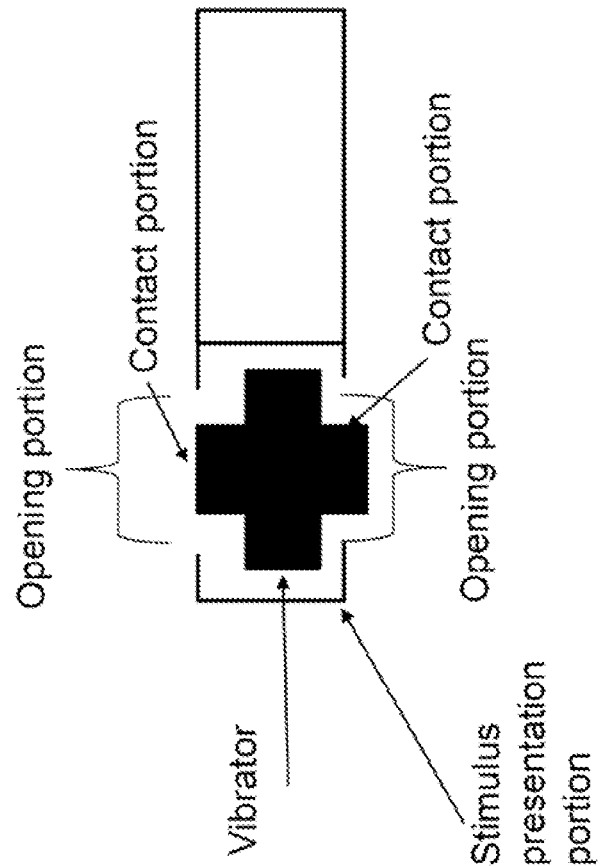
FIG. 7 is a schematic view that shows another contact portion.

As shown in FIG. 5 and FIG. 6, the vibration body includes a contact section that directly contacts the fingertip or the like of the user. In addition, the vibration body is coupled to the contact section via a vibration transmitting section.

As shown in FIG. 8 to FIG. 11, the vibration body is provided in the stimulus presenting section via bearings such that the vibration body can freely move in the stimulus presenting section. In a state where the friction is reduced, the vibration body is disposed in the stimulus presenting section. Instead of the bearings, a fluorine-coating material that is a material with low friction may be provided on a bottom of the vibration body and an inner bottom of the stimulus presenting section. Alternatively, a liquid such as oil may be applied to the bottom of the vibration body and the inner bottom of the stimulus presenting section. Furthermore, a sponge material may be disposed or inserted to fill a space between the vibration body and the inside of the stimulus presenting section. In this way, the vibration body can generate the vibration independently from the tactile force presenting device.

Figure 12:
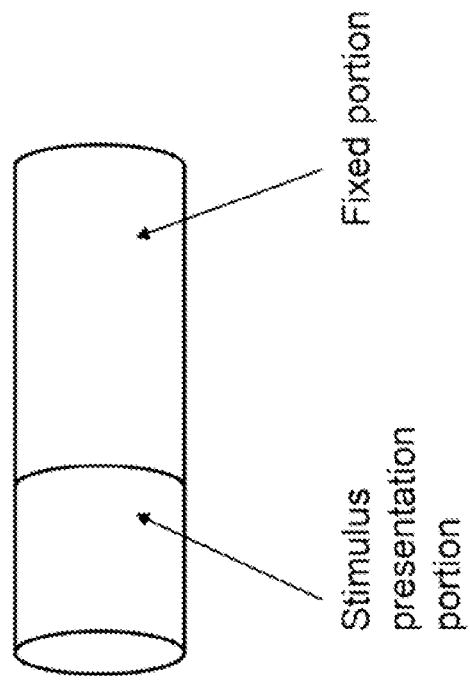
FIG. 12 is a schematic view that shows a modified example of the stimulus presenting section and the fixed section.
Figure 13:
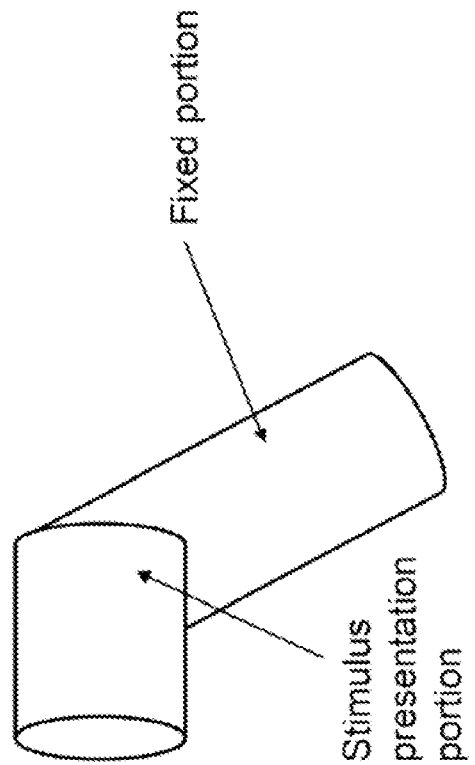
FIG. 13 is a schematic view that shows another modified example of the stimulus presenting section and the fixed section.

A shape of the tactile force information presenting system is not limited to a stick shape shown in FIG. 12. Instead, the tactile force information presenting system may be disposed to have a grip shape shown in FIG. 13, a ring shape shown in FIG. 14, or a mesh shape shown in FIG. 15.

Figure 14:
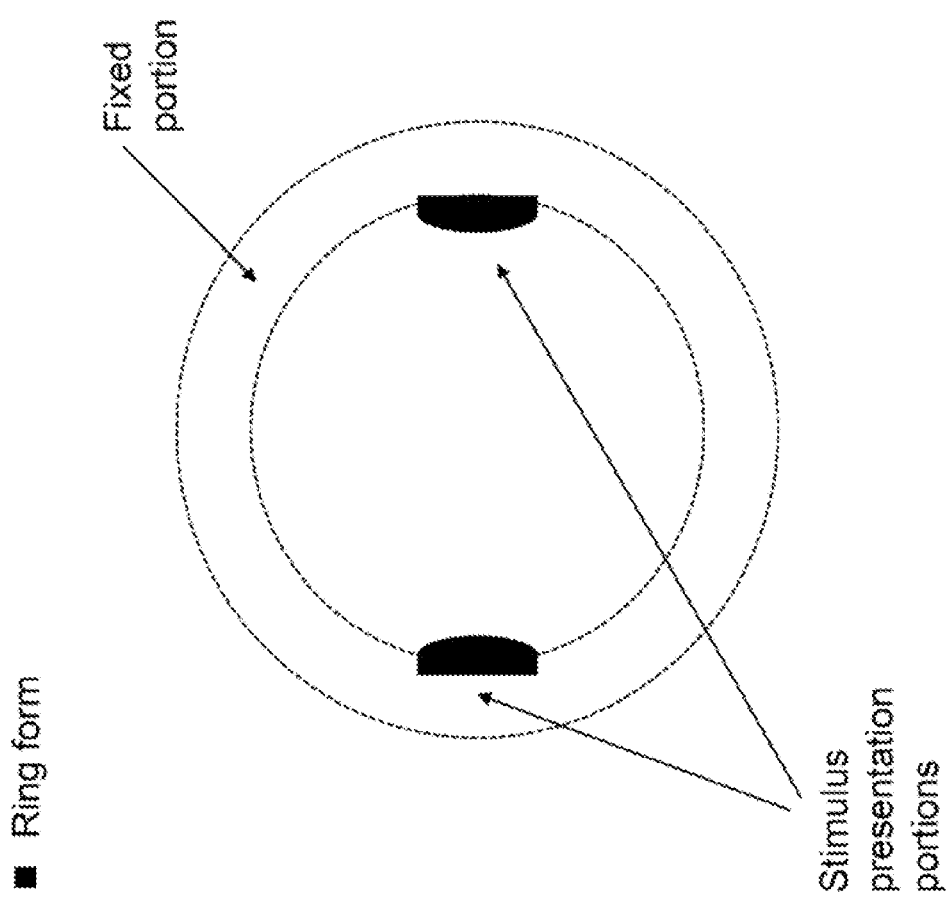
FIG. 14 is a schematic view that shows yet another modified example of the stimulus presenting section and the fixed section.
Figure 15:
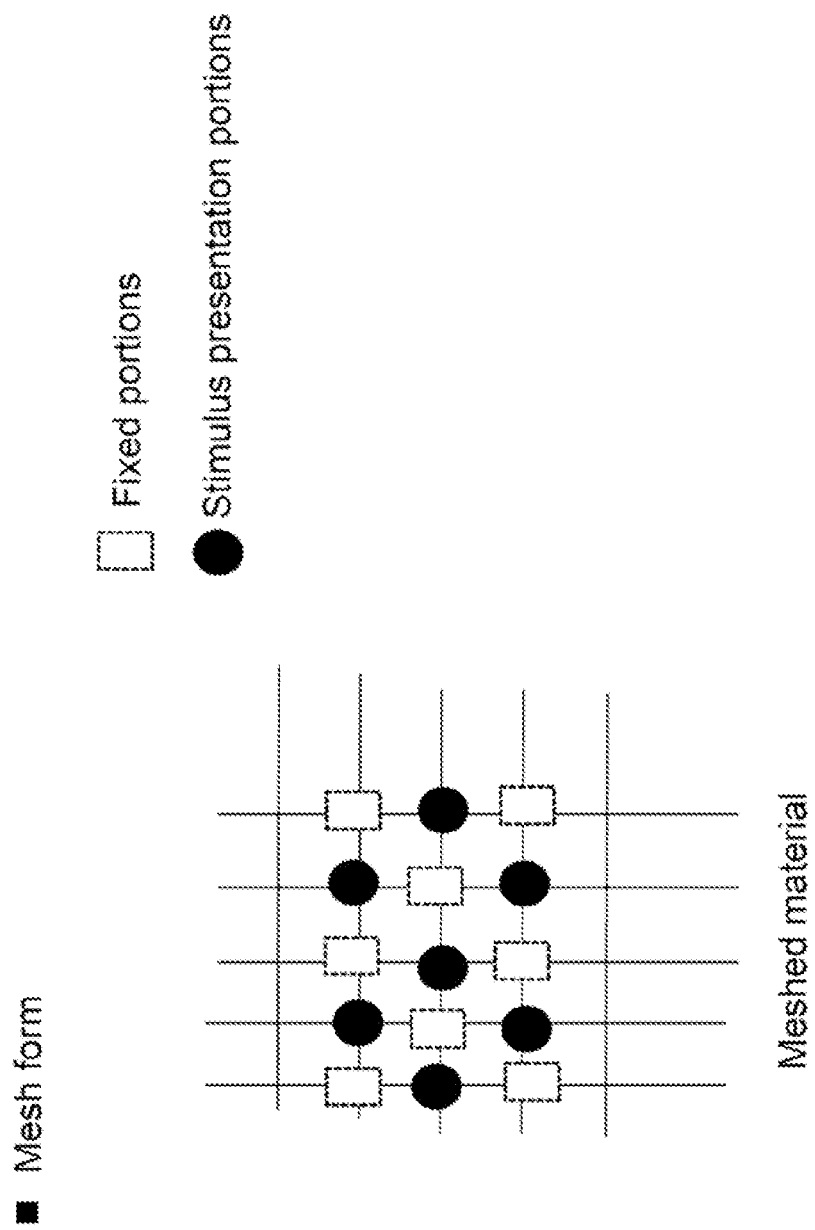
FIG. 15 is a schematic view that shows further another modified example of the stimulus presenting section and the fixed section.
Figure 16:
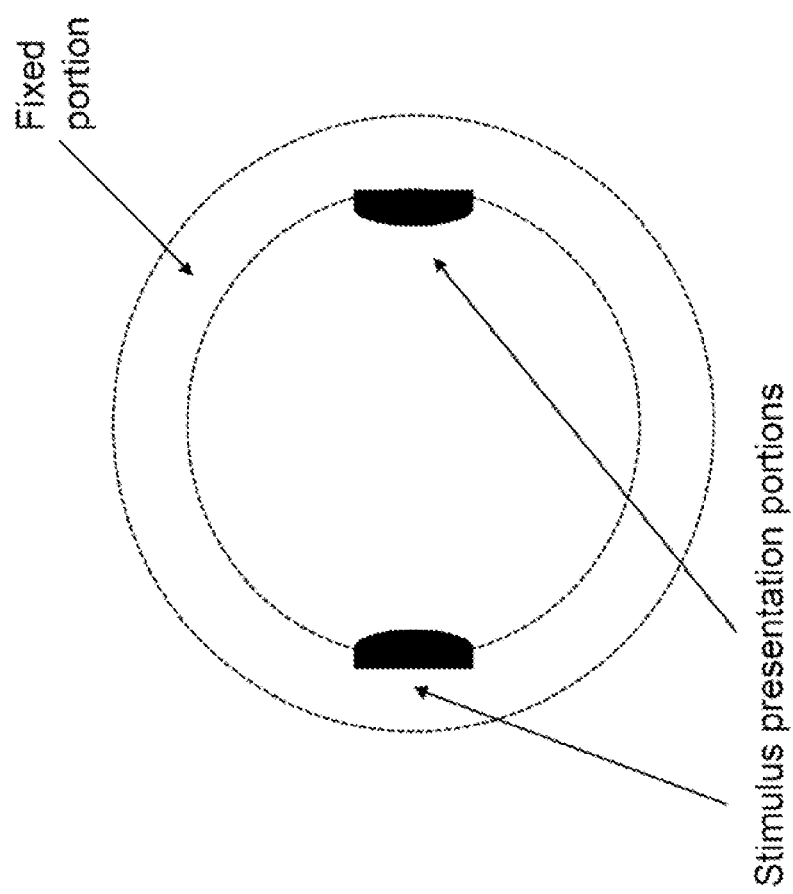
FIG. 16 is a schematic view that shows an operation of the stimulus presenting section.

In the case where the tactile force information presenting system is formed in the ring shape shown in FIG. 14, the fixed section is fitted to the finger or a wrist. While the fixed section comes in contact with and is fixed by the finger or the wrist, the stimulus presenting section stimulates the finger or the wrist. The number of the stimulus presenting section is not limited to one, and plural units thereof may be provided. In a case of the mesh shape in FIG. 15, plural units of the fixed section and the plural units of the stimulus presenting section are randomly arranged on a surface of a mesh material such as cloth. When the user places his/her hand on this mesh material, the fixed sections fix the entire hand, and the stimulus presenting section stimulates portions of the hand.

As described above, the stimulus presenting section is, preferably, the plural units of the stimulus presenting section are disposed with the fixed section. In this way, the stimulus presenting section can be actuated in accordance with an intensity difference, a phase difference, a frequency difference, a time difference, or the like.

A method for generating a stimulus is shown.

FIG. 17 is views showing a haptic information presentation method using a sensory characteristic relating to a force sensation, in which rotations of two eccentric rotators A912 and B913 are phase-synchronized to combine the displacement.

Here, FIG. 17b schematically shows a case where the two eccentric rotators A912 and B913 in FIG. 17a are synchronously rotated in the same direction with a phase delay of 180 degrees. As a result of this synchronous rotation, a torque rotation without eccentricity can be formed.

FIG. 17c schematically shows a case where a sensory characteristic 931 has a logarithmic function characteristic, indicating that the sensory characteristic 931 has, similarly to the sensory characteristic 211, has a sensory quantity 933 having a nonlinear characteristic of a logarithm or the like to a physical quantity 932 as a stimulus. When consideration is given to a case where a positive torque is generated at an operation point A934 on the sensory characteristic 931 and a negative torque in the opposite direction is generated at an operation point B935, a torque sensation 944 is represented as in FIG. 75D. A torque 943 is proportional to the time differential of a rotation velocity 942 of a rotator. When an operation is performed at the operation points A934 and B935, the torque sensation 944 is perceived.

The torque 943 is physically returned to an initial state 948 in one cycle, and its integral value is zero. However, the sensory integral value of the torque sensation 944 as a sensory quantity does not necessarily become zero. By suitably selecting the operation points A934 and B935 to set an operation point A duration time 945 and an operation point B duration time 946 suitably, the torque sensation can continue to be freely presented in an arbitrary direction.

The above is also established in the case of a rotational or translational displacement as well as in the case of a torque rotation or when the sensory characteristic 931 exhibits a nonlinear characteristic of an exponential function or the like. Even when the sensory characteristic 931 in FIG. 75C has a threshold value, a similar torque sensation occurs and the torque sensation can continue to be intermittently presented only in one direction.

Figure 18:
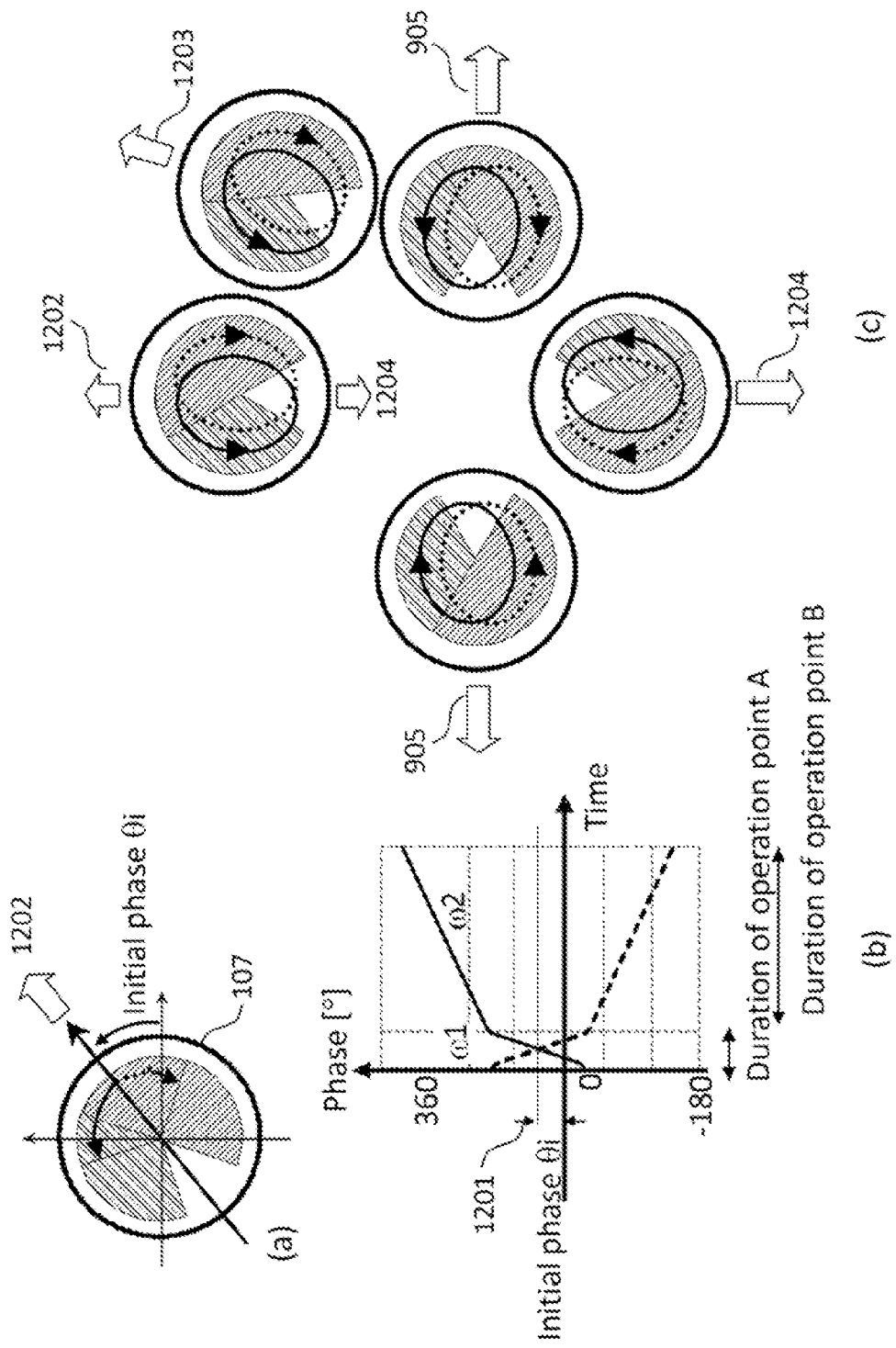
FIG. 18 is schematic views illustrating a method for controlling an actuator.

FIG. 18a shows the direction of a pseudo-haptic sensation that is induced by an initial phase (θi) of a phase pattern and perceived by the user.

A pseudo-haptic device 107 can control the direction 1202 of a pseudo-haptic sensation that is induced by a change in the momentum formed by the eccentric rotators to the direction of the initial phase (θi) by changing the initial phase (θi) at the beginning of rotation in FIG. 18b. For example, the pseudo-haptic device 107 can induce a pseudo-haptic sensation in an arbitrary direction within 360 degrees in a plane by changing the initial phase (θi) as shown in FIG. 18c.

At this time, when a pseudo-haptic interface device 101 has a large weight, the pseudo-haptic interface device 101 cannot create a sufficient buoyancy sensation 1202 which makes the user feel as if it is lifted up and may be felt heavy because an upward force sensation 1202 caused by the pseudo-haptic sensation and a downward force sensation 1204 caused by the gravity cancel each other out. In such a case, a decrease or inhibition of buoyancy sensation caused by the gravity can be reduced by inducing the pseudo-haptic sensation 1203 in a direction slightly offset from the direction opposite the direction of gravity.

When a pseudo-haptic sensation is desired to be presented in a direction opposite the direction of gravity, a pseudo-haptic sensation may be induced alternately in two directions slightly offset from the vertical direction, that is, at $180°+α°$ and $180°-α°$.

FIG. 19a to FIG. 19f show one example of control of a pseudo-haptic device (haptic device) that presents a basic haptic sensation or pseudo-haptic sensation.

Figure 19:
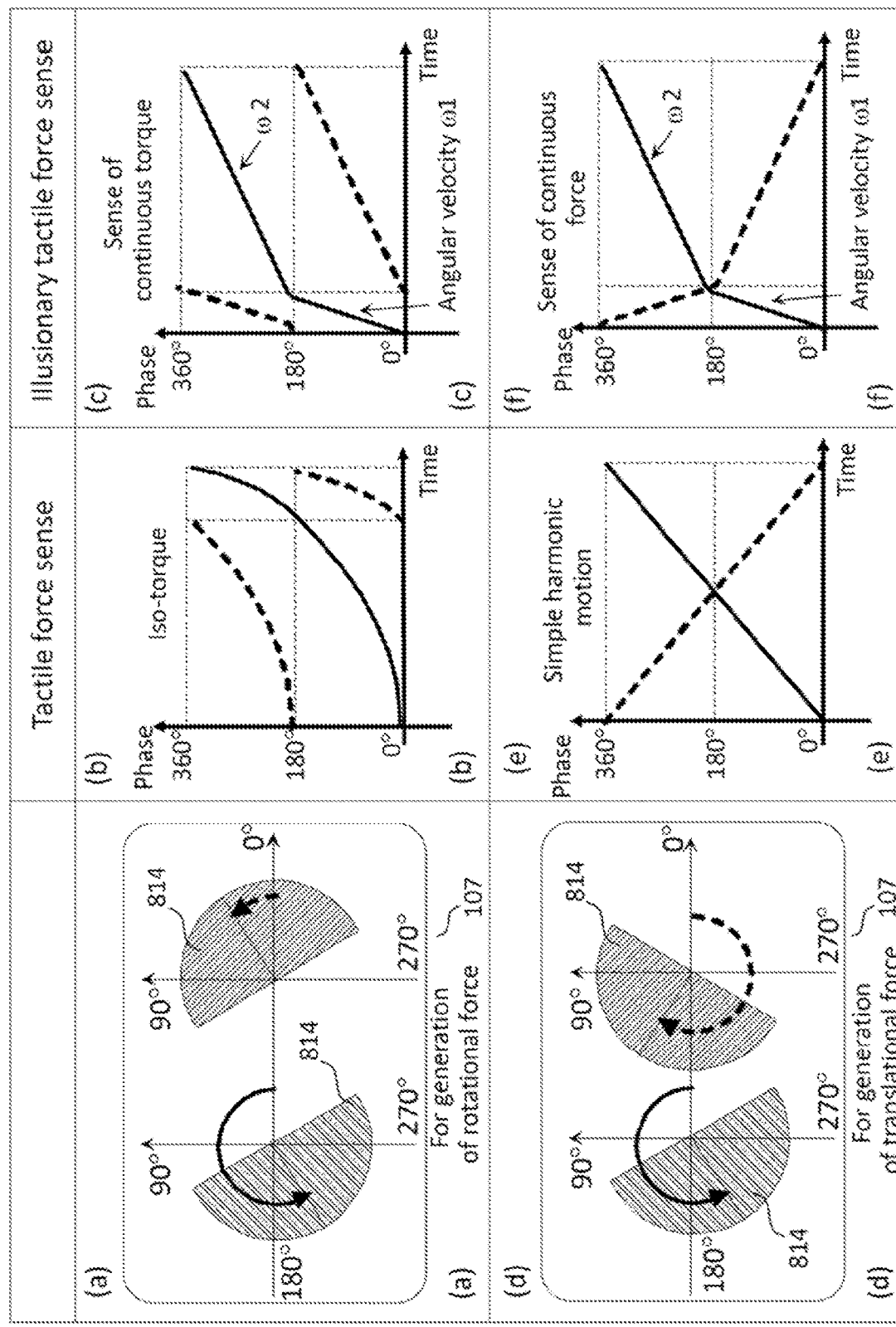
FIG. 19 is schematic views illustrating a method for controlling an actuator.

FIG. 19a schematically shows a method for generating a rotational force in a pseudo-haptic device 107, and FIG. 19d schematically shows a method for generating a translational force. Two eccentric weights 814 in FIG. 19a rotate in the same direction with a phase delay of 180 degrees. On the other hand, in FIG. 77D, the eccentric weights 814 rotate in the opposite directions.

(1) When two eccentric rotators are synchronously rotated in the same direction with a phase delay of 180 degrees as shown in FIG. 19b, a torque rotation without eccentricity is formed because the two eccentric rotators are located at point symmetrical positions and therefore the center of gravity coincides with the axis of rotation. This enables presentation of a rotational force sensation. However, because a time differential of angular momentum is a torque and because it is necessary to continue to increase the rotation velocity of a motor continuously in order to continue to present a torque in one direction continuously, it is in reality difficult to present a rotational force sensation continuously.

(2) A pseudo-haptic sensation of a rotational force continuous in one direction (continuous torque sensation) is induced by synchronous control using angular velocities ω1 and ω2 as shown in FIG. 17c.

(3) When the two rotators are synchronously rotated in opposite directions at a constant angular velocity as shown in FIG. 19e, a force that vibrates linearly in an arbitrary direction (simple harmonic oscillation) can be formed by controlling an initial phase θi 1201.

(4) When the two rotators are respectively rotated synchronously in opposite directions at angular velocities ω1 and ω2 according to a sensory characteristic relating to a pseudo-haptic sensation as shown in FIG.19c and FIG. 19f, a pseudo-haptic sensation of a translational force that is continuous in one direction (continuous force sensation) is induced.

In the pseudo-haptic interface device 101, when the rotation velocities (angular velocities) and the phase synchronization are adequately controlled based on a human sensory characteristic as shown in FIG. 19c and FIG. 19f, the control circuit can be simplified because a pseudo-haptic sensation can be induced only by combining two angular velocities (ω1, ω2).

Figure 20:
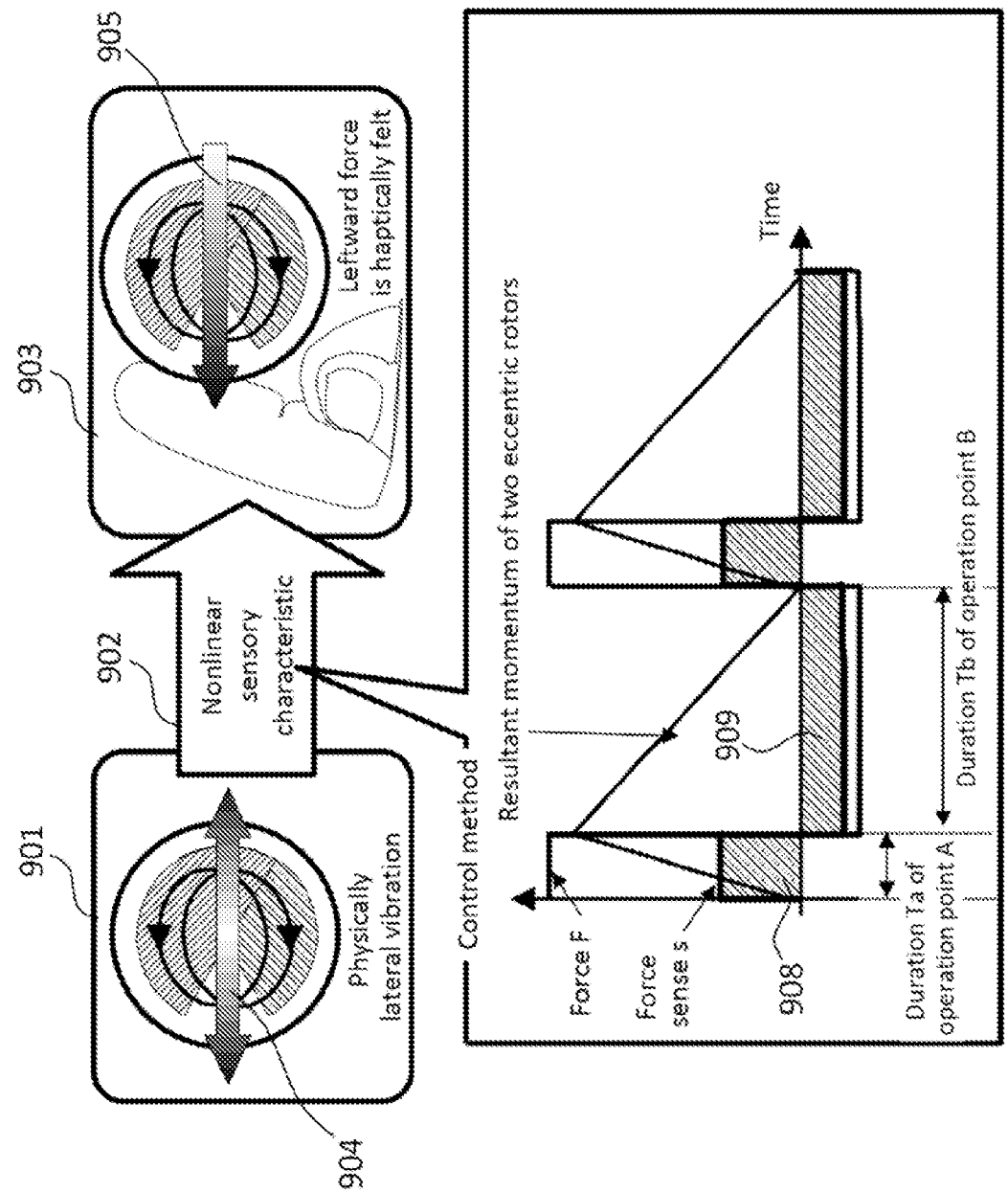
FIG. 20 is a schematic view illustrating a method for producing a pseudo-haptic sensation.

FIG. 20 schematically shows the phenomenon in FIG. 17 and its effect. By controlling the rotation pattern of an eccentric motor 815 to vary the combined momentum of the two eccentric rotators temporally in view of a sensory characteristic relating to a pseudo-haptic sensation, it is possible to induce a sensory illusion 905 that makes the user perceive a force acting continuously in one direction from vibration 904 that periodically accelerate or decelerate about an equilibrium point. In other words, a sensory illusion that makes the user feel as if a force is acting in one direction is induced regardless of the fact that no force component acting in one direction exists physically.

When the rotators are alternately accelerated or decelerated at the operation points A and B every time the phase changes by 180 degrees, a force sensation 905 in one direction is continuously perceived. The force is physically returned to an initial state in one cycle, and its momentum and an integral value of the force are zero. In other words, the acceleration-deceleration mechanism remains around the equilibrium point and does not move leftward. However, the sensory integral value of the force sensation as a sensory quantity does not become zero. At this time, the perception of an integral 908 of a positive force decreases and only an integral 909 of a negative force is perceived.

Here, because a time differential of an angular momentum is a torque and a time differential of a momentum is a force and because it is necessary to continue to increase the rotation velocity of a motor or a linear motor continuously in order to continue to generate a torque and a force in one direction, a method in which a rotating body or the like is periodically rotated is not suitable for continuously presenting a force sensation in one direction. In particular, it is physically impossible to present a continuous force in one direction with a non-base type interface such as those used in mobile devices.

However, because humans have a nonlinear sensory characteristic, it is possible to make them perceive a force or force pattern that is different from physical properties illusionally by utilizing the perceptual sensitivity relating to a pseudo-haptic characteristic or controlling the acceleration-deceleration patterns of momentum when the method of the present invention is used. For example, the human's sensory characteristic has different sensitivities to stimuli of different intensities (here, sensitivity is defined as the ratio of the intensity of the perceived stimulus to the intensity of the given stimulus); they are more sensitive to weak stimuli and less sensitive to strong stimuli. Thus, by controlling the acceleration and deceleration phases of motor rotation to repeat acceleration and deceleration periodically, it is possible to present a continuous force sensation in the direction in which a weak stimulus is presented. In addition, it is also possible to present a continuous force sensation in the direction in which a strong stimulus is presented by selecting operation points A and B with an appropriate sensory characteristic.

A driving simulator is considered as a similar device. In a driving simulator, acceleration of a vehicle is presented by slowly returning the user to the original position with acceleration that is too small to be noticed after a target force (acceleration feeling) is given. Thus, the force is presented intermittently. It is, therefore, impossible to present a force sensation or acceleration feeling feel in one direction continuously with such an asymmetric acceleration type method. The situation is the same even with a conventional haptic interface device. However, in the present invention, a sensory illusion is utilized to present a translational force sensation 905 that is continuous in one direction. In particular, the pseudo-haptic interface device 101, which uses a sensory illusion, is characterized in enabling the user to perceive a continuous force in a direction opposite the direction of an intermittent force that is presented by a physical method in the above driving simulator.

In other words, by utilizing the human nonlinear sensory characteristic that shows different sensitivities to different intensities, even if the integral of forces that are generated by periodical acceleration and deceleration or vibration is physically zero, the forces are not cancelled out sensuously and a translational force-like force sensation 905 or torque feeling is presented continuously in a negative direction 909 as a target direction (see FIG. 19c for a method for producing a continuous torque sensation). In this case, a positive force 908 is not perceived. These phenomena provide the same effect for any nonlinear characteristics even when a sensory characteristic 831 has a non-logarithm sensory quantity with respect to a physical quantity 832 as a stimulus. This effect can be achieved with a non-base type interface as well as with a base type interface.

In FIG. 20, when the rotation duration time Ta at the operation point A is reduced close to zero, the combined momentum in the section of the rotation duration time Ta becomes large and the force sensation also become large because the momentum in the each section of the rotation duration times Ta and Tb are equal to each other. However, because the force sensation changes logarithmically and the sensitivity decreases, the integral of the perceived value in the section of the rotation duration time Ta approaches zero. Thus, the force sensation in the section of the rotation duration time Tb becomes relatively larger and the continuity of the force sensation 905 in one direction improves. As a result, it is possible to continue to present a force sensation freely in an arbitrary direction by suitably selecting the operation points A and B and suitably setting an operation point A duration time and an operation point B duration time to adjust the synchronized phase between the two eccentric rotators A and B.

Figure 21:
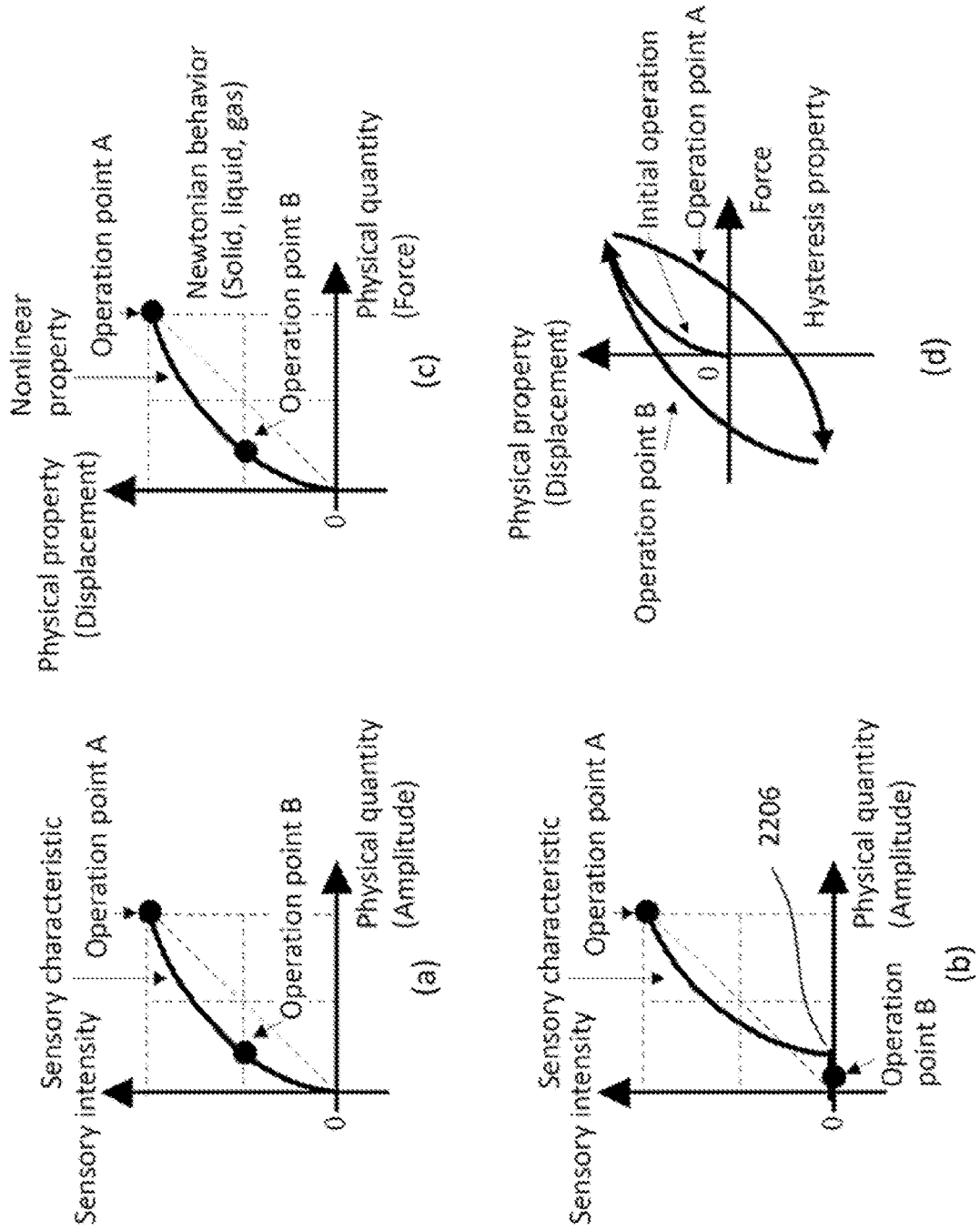
FIG. 21 is schematic views illustrating a sensory characteristic.

FIG. 21 show nonlinear characteristics that are used in the pseudo-haptic interface device. In the drawing, a sensory characteristic (FIG. 21a and FIG. 21b), a nonlinear characteristic of a viscoelastic material (FIG. 21c), and a hysteresis characteristic of a viscoelastic material (FIG. 21d) are shown.

Figure 8:
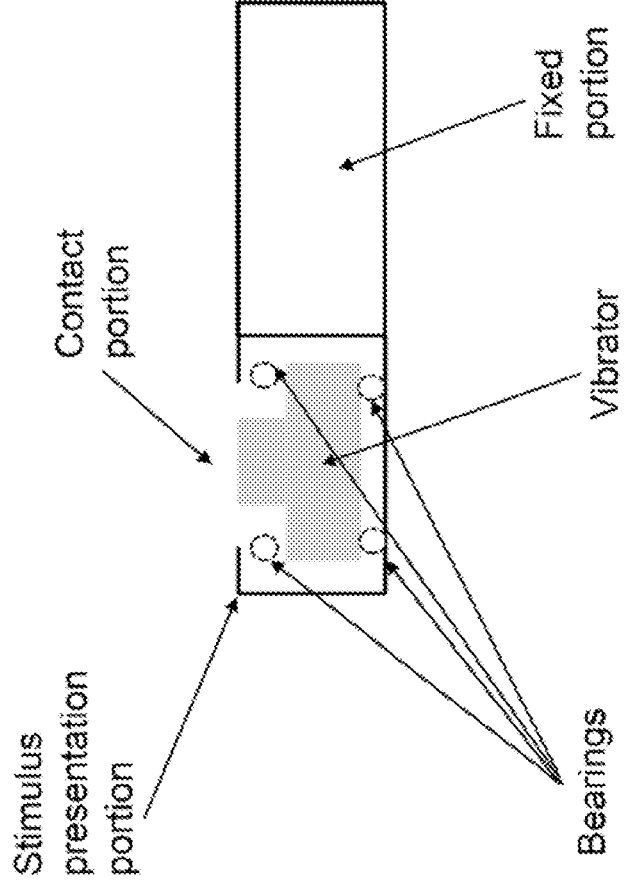
FIG. 8 is a schematic view that shows a contact method of the stimulus presenting section with a vibration body.
Figure 9:
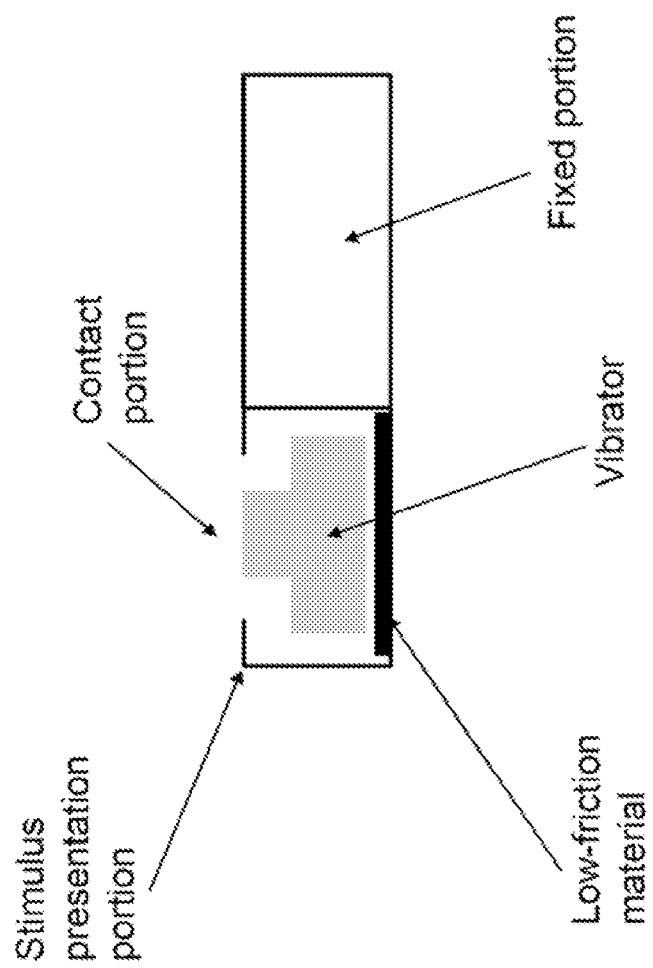
FIG. 9 is a schematic view that shows another contact method of the stimulus presenting section with the vibration body.
Figure 10:
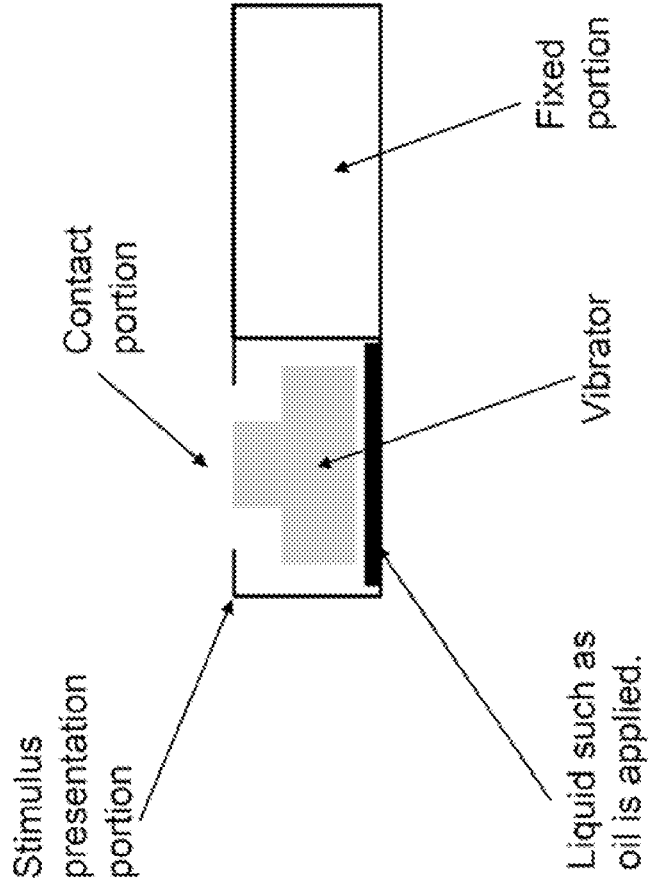
FIG. 10 is a schematic view that shows yet another contact method of the stimulus presenting section with the vibration body.
Figure 11:
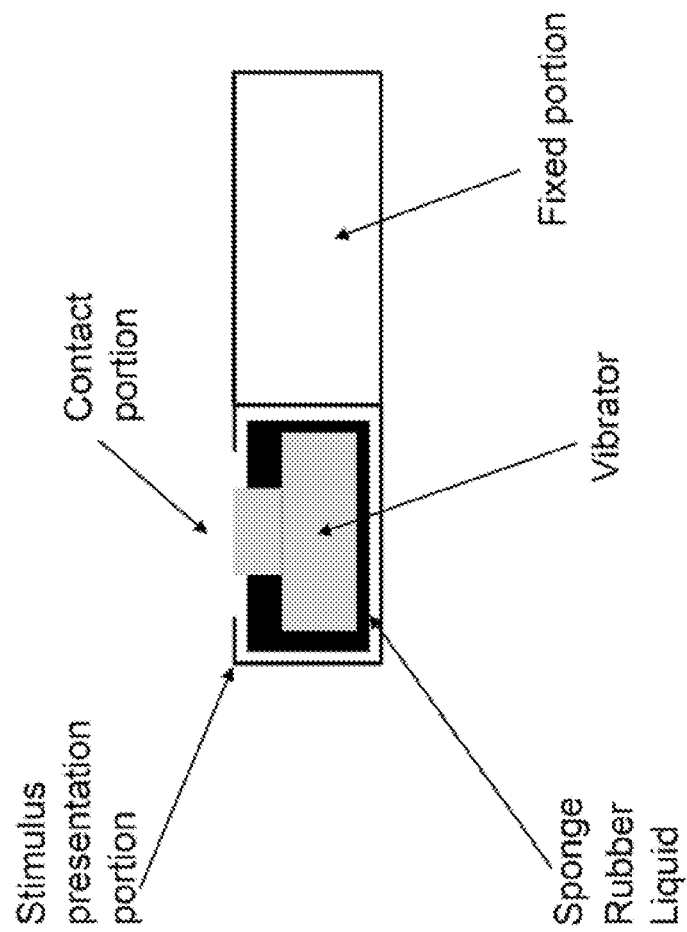
FIG. 11 is a schematic view that shows further another contact method of the stimulus presenting section with the vibration body.

FIG. 21b is a schematic view showing, similarly to FIG. 8, a sensory characteristic of a human having a threshold value 2206 for a physical quantity. The drawing shows that a sensation which does not exist physically is induced as a pseudo-haptic sensation when the pseudo-haptic interface device is controlled in view of this sensory characteristic.

When a material having physical properties which show a nonlinear stress characteristic in response to an applied force is interposed between a device that generates a drive force such as displacement, vibration, torque or force and an integumentary sense organ of a human as shown in FIG. 21C, a similar pseudo-haptic sensation is also induced.

In addition, as shown in FIG. 21d, the sensory characteristic is not isotropic between a time when displacement is increased and a time when it is decreased, for example, between a time when a muscle is extended and a time when it is contracted, and often indicates a hysteresis sensory characteristic. A muscle contracts significantly immediately after it is pulled strongly. When such a strong hysteresis characteristic is generated, an induction of a similar pseudo-haptic sensation is promoted.

Figure 22:
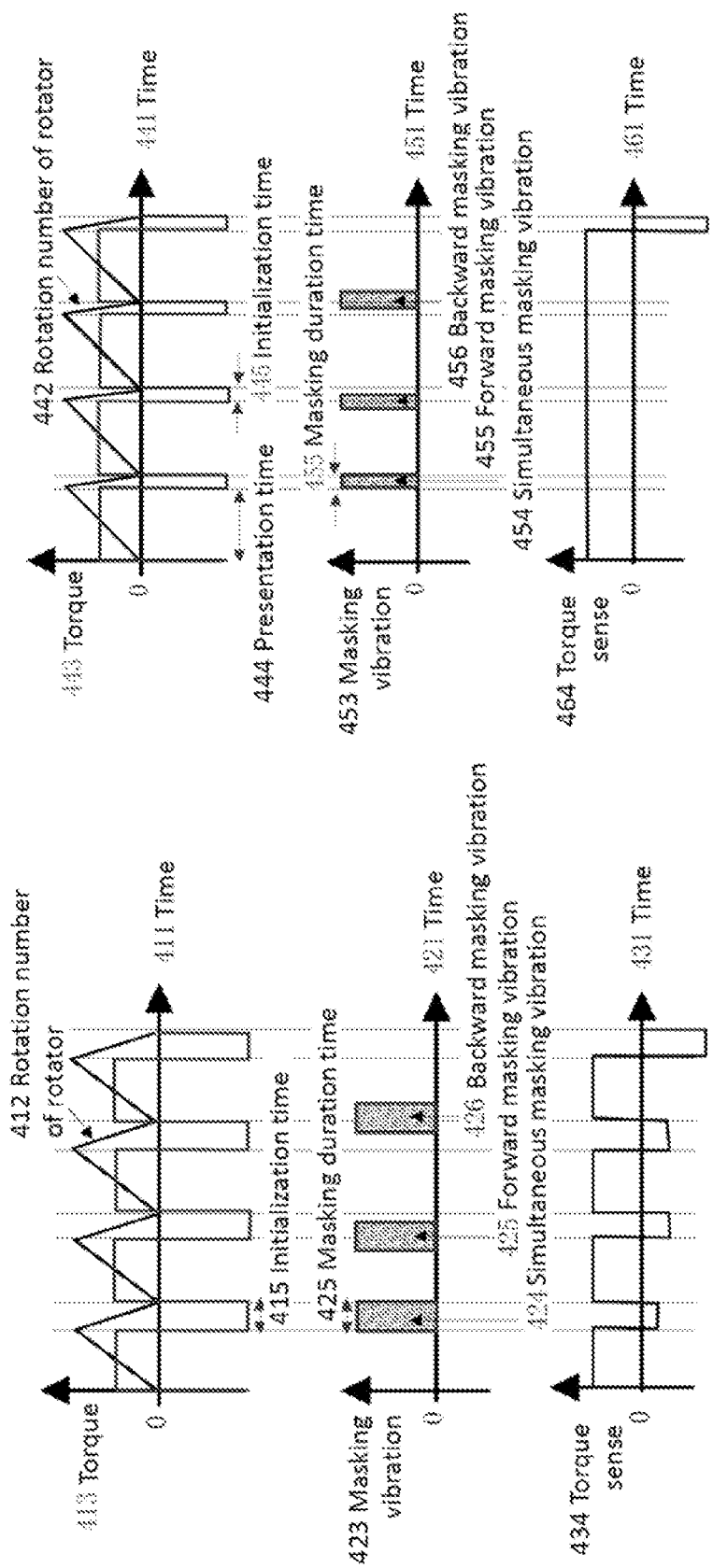
FIG. 22 is schematic views illustrating a sensory characteristic.

FIG. 22 is views showing a haptic information presentation method using a method in which a sensory characteristic is changed by a masking effect relating to a force sensation as one example of a method for changing the sensory characteristic.

The sensory characteristic is masked by a masking displacement (vibration), and a torque sensation 434 is decreased. As this masking method, simultaneous masking 424 (having satisfactory results in masking of the visual sense and hearing sense), forward masking 425 and backward masking 426 are enumerated. FIG. 80A schematically shows a torque 413 as a maskee, and the torque sensation 434 perceived at this time is represented as in FIG. 80C. The torque 413 is proportional to the time differential of a rotation velocity 412 of a rotator.

At this time, initialization times 415 in which the rotation velocity 412 of the rotator is initialized and masking duration times 425 corresponding thereto are shortened like initialization times 445 and masking duration times 455 shown in FIG. 6 (FIG. 22d) until they become shorter than a certain specific time, critical fusion occurs in which although a negative torque due to the initialization physically exists, it is felt as if torque is continuously presented like a torque sensation 464.

A masker to generate a masking displacement (vibration) may be a rotator different from a rotator as a maskee by which torque is masked or the rotator itself as the maskee. The case where the rotator of the maskee also serves as masker means that at the time of masking, the rotator is controlled to generate the masking displacement (vibration) by the control device. The displacement (vibration) direction of the masker may or may not be the same as the rotation direction of the rotator as the maskee.

The above can also occur in the case where the maskee and the masker are the same stimulus (in the case where the rotator of the maskee serves also as a masker).

Figure 23:
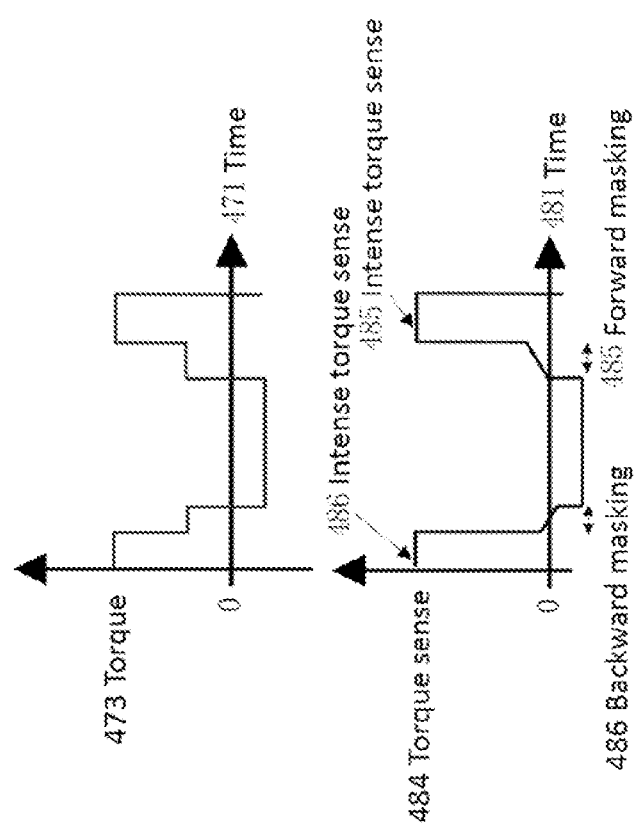
FIG. 23 is a schematic view illustrating a sensory characteristic.

FIG. 23 schematically shows this case. As shown in FIG. 23, before and after strong torque sensations 485 and 486, a torque sensation 484 is decreased by a forward masking 485 and a backward masking 486.

With respect to the sensory characteristic, the sensitivity of a torque sensation 517 is changed according to a muscle tensile state or at least one state of physical, physiological and psychological states. For example, when a muscle is instantaneously extended by a presented torque 514 (high torque 524 in a short time) as an external force, a sensor called a muscle spindle in the muscle senses this, and the muscle is quickly contracted in a conditioned reflex way by a muscle cause torque 515 (muscle reflex cause torque 525) having power not lower than this external force. At this time, myoelectricity 511 is generated. Upon detecting it, a control circuit 512 controls a haptic presentation device 513, and changes the sensitivity of the torque sensation 517 by activating a presented torque 516 (gentle middle torque 526) in synchronization with the contraction of the muscle.

The above is established not only in the muscle tensile state but also in the case of the change of sensory sensitivity due to at least one state of breath, posture and neural firing states.

In a palm, the sensitivity is different according to the palm direction because of the anatomical structure of a skeleton, joint, tendon, muscle and the like. A direction presentation with high precision becomes possible by correcting the intensity (rotation velocity $\omega 612$) of the presented physical quantity in conformity with the sensitivity (anisotropic sensitivity curve 611) dependent on the palm direction.

Figure 24:
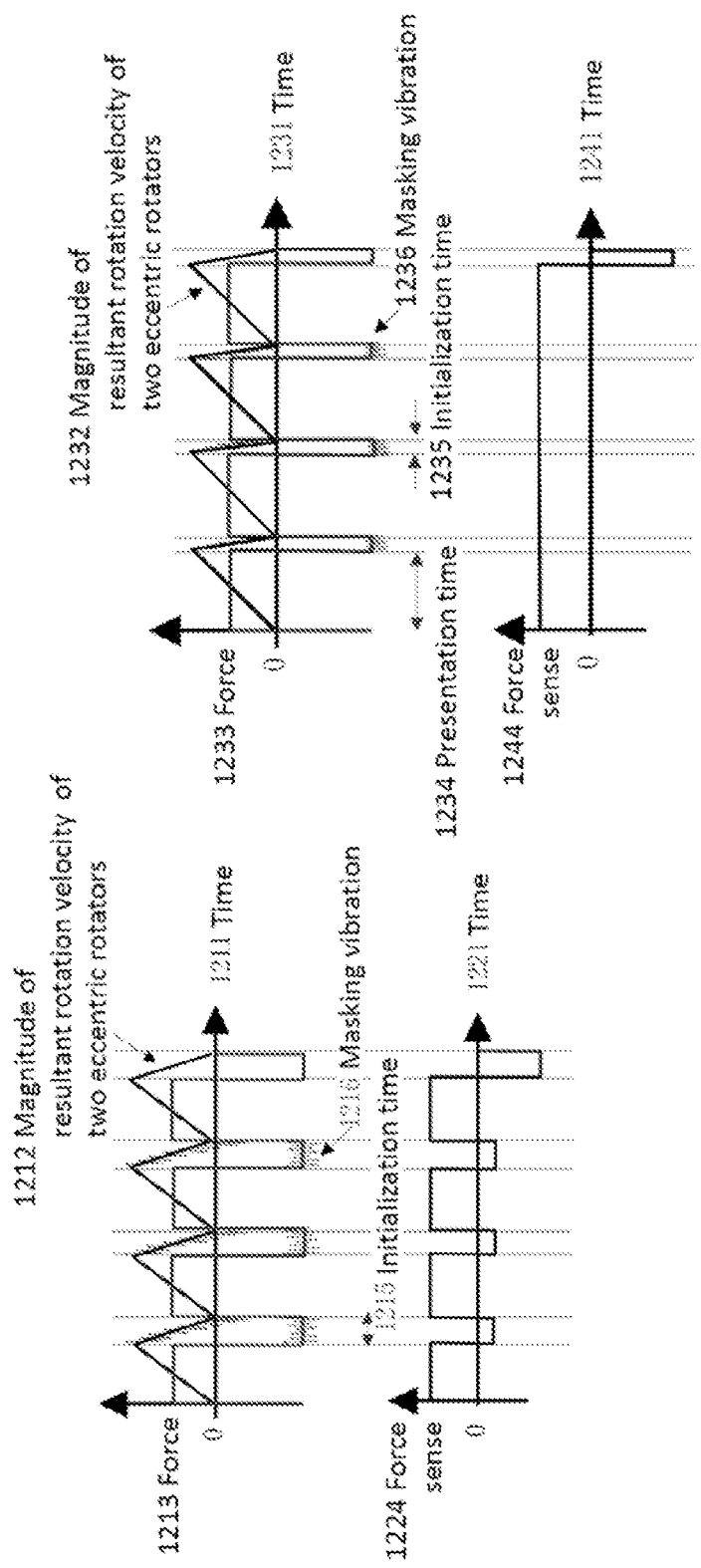
FIG. 24 is schematic views illustrating a sensory characteristic.

FIG. 24 is views showing a method for presenting vibration haptic information in an arbitrary direction using a method in which a sensory characteristic is changed by a masking effect relating to a force sensation as one example of a control method for continuously or intermittently presenting haptic information on at least one of a displacement sensation, a vibration sensation, a force sensation and a torque sensation in an arbitrary direction.

The sensory characteristic is masked by a masking displacement (vibration) 1216, and a force sensation 1224 is decreased. This masking displacement (vibration) can be generated by synchronizing the rotation velocity 1022 of the eccentric rotator A with the rotation velocity 1023 of the eccentric rotator A in FIG. 17b to change (fluctuate) the velocities as shown in FIG. 17b. FIG. 24a schematically shows this, and the force sensation 1224 perceived at this time is represented as in FIG. 24b. A force 1213 is proportional to the time differential of a magnitude 1212 of the combined rotation velocity of the two eccentric rotators.

At this time, when initialization times 1215 in which the rotation velocity 1212 of the rotator is initialized are shortened until they become shorter than a certain specific time as shown in FIG. 24c, critical fusion occurs in which although a negative force due to the initialization physically exists, it is felt as if a force is continuously presented like a force sensation 1244.

The above also occurs in the case where a maskee and a masker are different rotators, and a similar continuous presented sensation occurs not only in the case of a force but also in the case of a torque.

Figure 25:
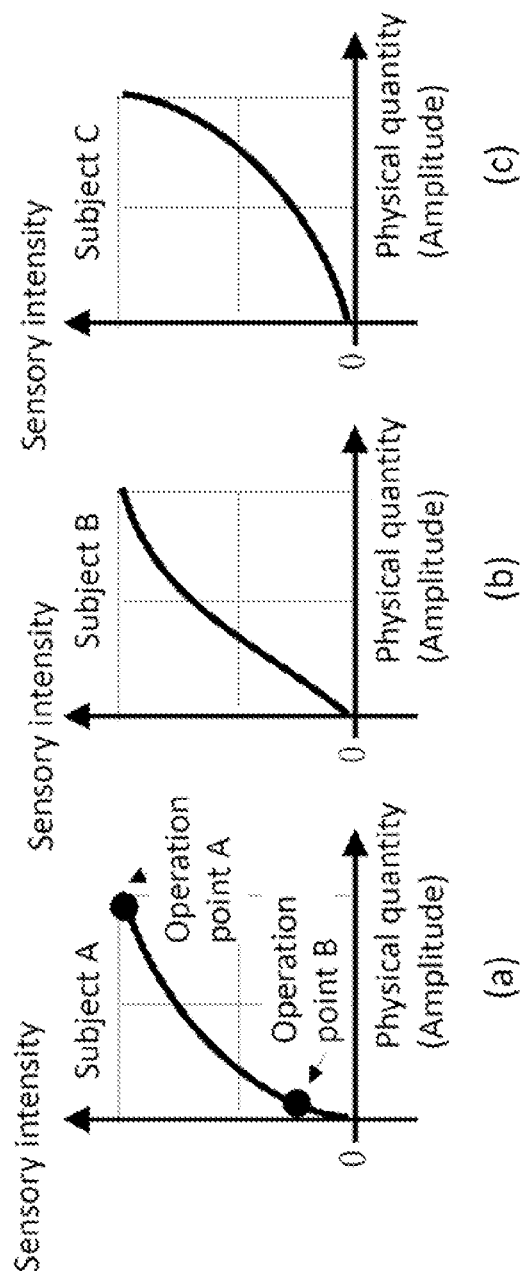
FIG. 25 is schematic views illustrating a sensory characteristic.

Like the sensory characteristic shown in FIG. 25a to FIG. 25c, different users have different sensory characteristics. Thus, some people clearly perceive a pseudo-haptic sensation but some do not, and some people improve their perceptivity by learning. The present invention has a device that corrects such differences among individuals. In addition, when the same stimulus is persistently presented, the sensation to the stimulus may become dull. Thus, fluctuating the intensity, frequency and/or direction of stimulus is effective to prevent the user from getting used to the stimulus.

FIG. 15d shows one example of a method for presenting a force in one direction using a pseudo-haptic sensation.

When a high rotation velocity ω1 (high frequency f1) 1002a at an operation point A and a low rotation velocity ω2 (low frequency f2) 1002b at an operation point B are alternately presented at phase intervals of 180 degrees in a method in which displacement components or vibration components from two eccentric vibrators rotated in opposite directions are combined, the pseudo-haptic sensation intensity (II) is proportional to the logarithm of the acceleration-deceleration ratio $\Delta f/f$ (wherein ($f=(f1+f2)/2$, $\Delta f=f1-f2$)) of the frequencies which are the rotation velocities of the eccentric rotators (FIG. 83E). The gradient n that is created when the logarithmic values of the pseudo-haptic sensation intensity and $\Delta f/f$ are plotted represents an individual difference.

In addition, a sensation intensity (VI) represents the intensity of a displacement component or vibration component that is perceived simultaneously with a force sensation in one direction caused by a sensory illusion. The intensity of the displacement component or vibration component is approximately inversely proportional to the physical quantity f (logarithm), and the sensation intensity (VI) relatively decreases when the frequency f is increased (FIG. 25f). By controlling the intensity containing the displacement component or vibration component, the texture of force is changed when a pseudo-haptic sensation is presented. The gradient m that is created when the logarithms are plotted represents an individual difference. The values n and m each representing an individual difference change as learning proceeds and converges to a certain value when the learning is saturated.

Figure 26:
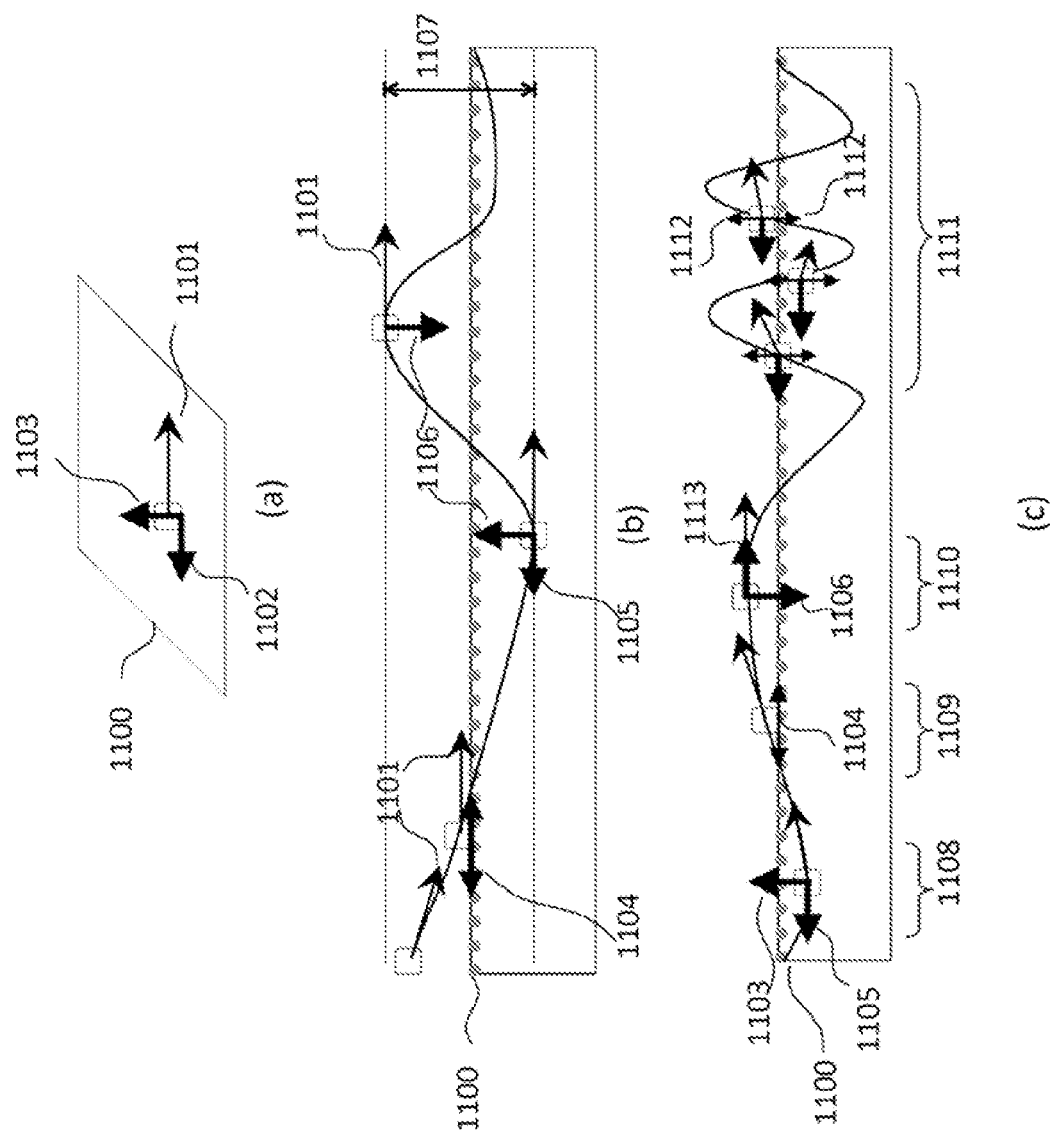
FIG. 26 is schematic views illustrating a control method.

FIG. 26a to FIG. 26c show a method for expressing a texture of a virtual flat plate 1100. The motion of the pseudo-haptic interface device 101 represents the motion 1101 (position, posture angle, velocity or acceleration) of a virtual object monitored by the pseudo-haptic interface device 101 through sensing, and a friction sensation 1109 or roughness sensation 1111 as a texture of the virtual flat plate and its shape are controlled by controlling the direction, intensity and texture parameters (contained vibration components) of a resisting force 1102 created by the pseudo-haptic sensation in response to the motion of the virtual object.

FIG. 26a shows a resisting force 1103 that acts from the virtual flat plate to a virtual object when the virtual object (pseudo-haptic interface device 101) is moved on the virtual flat plate 1100 and the resisting force 1102, which acts against the motion.

FIG. 26b shows that a frictional force 1104 that acts between the pseudo-haptic interface device 101 and the virtual flat plate 1100 when they are in contact with each other vibrationally alternates between kinetic and static frictions. In addition, the pseudo-haptic interface device 101 makes the user to perceive the presence and shape of the virtual flat plate by presenting a resisting force 1106 that push the pseudo-haptic interface device 101 back so that the pseudo-haptic interface device 101 remains within the tolerance thickness 1107 of the virtual flat plate by feedback control. The resisting force for pushing the pseudo-haptic interface device 101 back is not presented when the pseudo-haptic interface device 101 is not on the virtual flat plate 1100. The resisting force is presented only when the pseudo-haptic interface device 101 is on the virtual flat plate 1100 so that the user can perceive the presence of a wall.

FIG. 26c shows a method for expressing a surface roughness. The pseudo-haptic interface device 101 makes the user to feel resistance or stickiness 1108 by presenting a resisting force in a direction opposite the direction 1101 in which the pseudo-haptic interface device 101 is moved based on its moving velocity or acceleration. The pseudo-haptic interface device 101 can emphasize the smooth feeling 1110 of the virtual flat plate as if it is sliding on ice by presenting a negative resisting force (accelerating force 1113) in the same direction as the direction in which the pseudo-haptic interface device 101 is moved. Such an acceleration feeling or smooth feeling 1110, which is difficult to present with a non-base type haptic interface device using a conventional vibrator, is the texture and effect that are achieved by the pseudo-haptic interface device 101, which uses sensory illusions. In addition, the pseudo-haptic interface device 101 makes the user to perceive a surface roughness sensation 1111 of the virtual flat plate by vibrationally fluctuating the resisting force (a fluctuating resisting force 1112).

Figure 27:
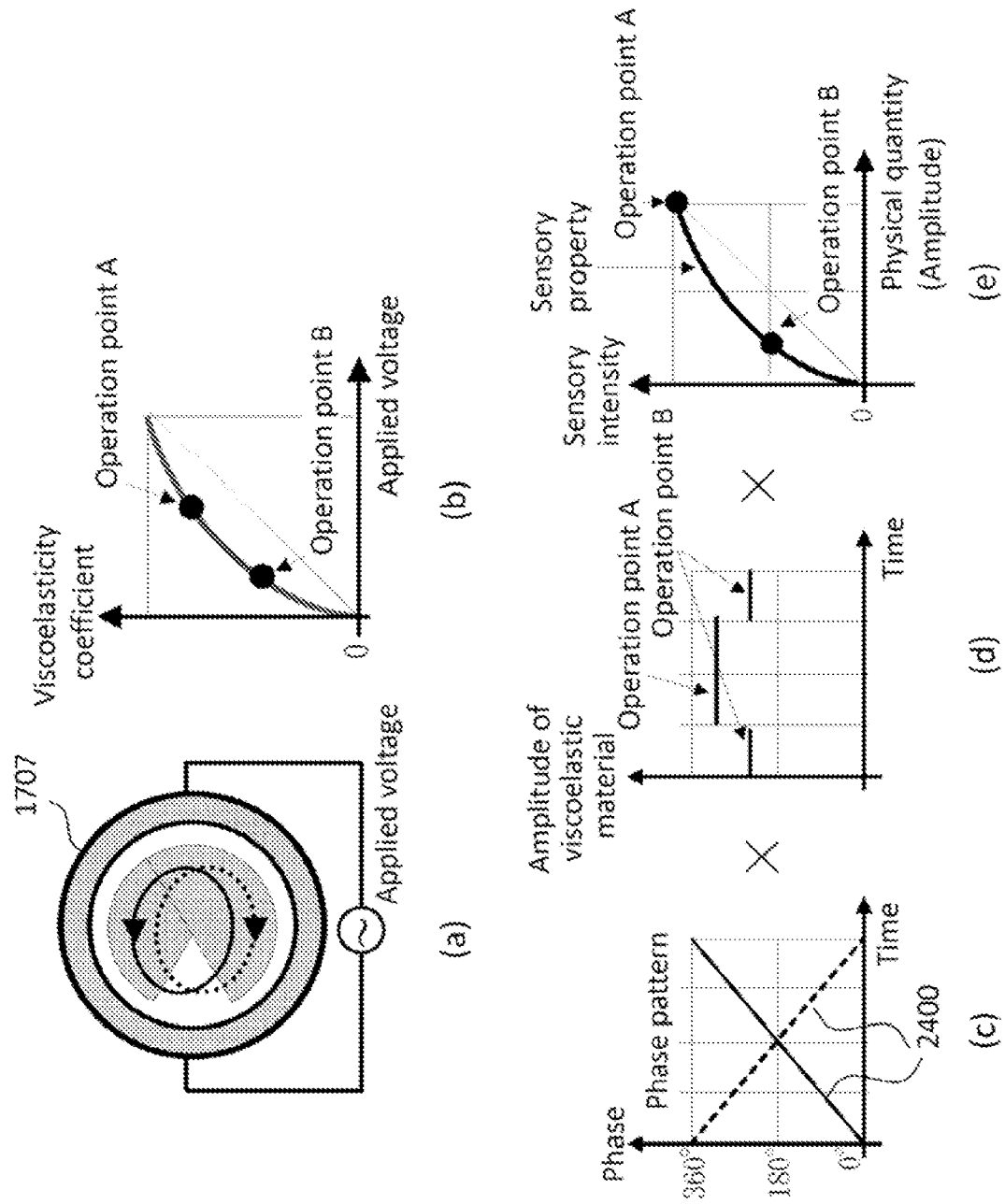
FIG. 27 is schematic views illustrating nonlinear controllability of physical properties.

FIG. 27 shows a control algorithm using a viscoelastic material whose properties change depending on an applied voltage.

In a method using a viscoelastic material, materials with different stress-deformation characteristics (2403, 2404) are attached but a material 1707 whose viscoelastic properties change depending on an applied voltage as shown in FIG. 27a may be used. By controlling the applied voltage to change the viscoelastic coefficient (FIG. 27b), the rate of transfer of the momentum that is generated by the eccentric rotators and is changed periodically to the palm is changed in synchronization with the rotational phases of the eccentric rotators. Then, because the momentum that is transferred to the palm or finger tip can be controlled by temporally changing the viscoelastic properties so that they can reach the characteristic values at operation points B and A as shown in FIG. 27d, the same effect as that achieved by increasing or decreasing the rotation velocity of the eccentric rotators can be achieved even when the eccentric rotators are being rotated at a constant rotation velocity as shown in FIG. 27c (constant-velocity rotation).

In addition, this method has the same effect as simulatively changing the physical properties of the skin, and has the effect of simulatively changing the sensory characteristic curve (FIG. 27e). Thus, it can be used in control to absorb differences in sensory characteristic among individuals or to enhance the efficiency in inducing a pseudo-haptic sensation. In addition, a viscoelastic material may be attached to the finger tip or body of the user as shown in FIG. 27f similarly to the case where a viscoelastic material is attached to a surface of the pseudo-haptic device as shown in FIG. 27a. Here, the quality and characteristics of the viscoelastic material are not limited as long as its stress-strain characteristics can be linearly controlled by changing the applied voltage. In addition, the control method is not limited to the control using an applied voltage as long as nonlinear control can be used.

When the rotation of a motor is accelerated and decelerated repeatedly as shown in FIG. 27b, large energy loss and heat generation occur. In this method, however, because the rotation velocity of the motor is constant (FIG. 27c) or the acceleration ratio f1/f2 has a value close to 1 and because the characteristics are changed by changing the applied voltage, the energy consumed in this method is smaller than the energy that is consumed when a motor is accelerated and decelerated.

Figure 28:
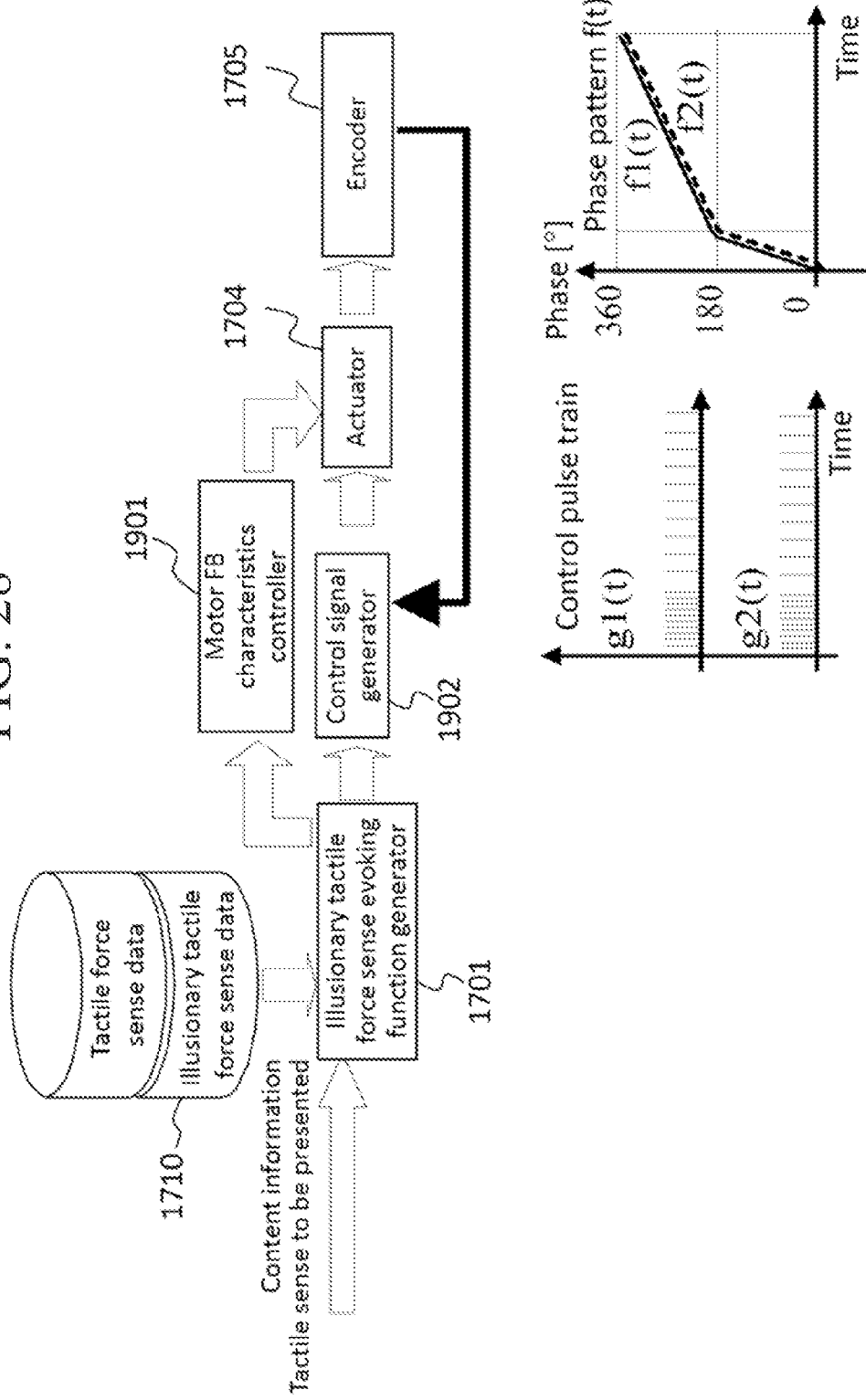
FIG. 28 is a schematic view illustrating a method for controlling an actuator.

FIG. 28 shows one example of control of the pseudo-haptic interface device 101.

In this device, a motor 1704 is controlled by a motor feedback (FB) characteristic controller that controls a feedback characteristic of the motor 1704 and a control signal generator that converts a pseudo-haptic sensation induction pattern into a motor control signal. In the present invention, it is essential to control the synchronization of phase patterns θ(t)=F(u, II, VI, R) of motor rotation, and it is necessary to synchronously control it temporally with high accuracy. As one example of a method for that, position control using a pulse train for controlling a servo motor is herein shown. When a step rotator is used for position control, it often loses synchronism or becomes uncontrollable easily because of sudden acceleration or deceleration. Thus, here, pulse position control using a servo motor is described. In the present invention, which uses a number of pseudo-haptic interface devices 101 that are synchronously controlled, when control is divided into control of a motor feedback (FB) control characteristic and motor control using a pulse position control method, consistency of motor control signals that is required when a different motor is used, quick generation of a pseudo-haptic sensation induction pattern, and scalability which enables the devices to easily adapt to an increase of the number of control motors to be synchronously controlled can be achieved. In addition, correction of personal differences can be made easily.

In a pseudo-haptic induction function generator 1701, a motor FB characteristic controller and a motor control signal generator are controlled by separate control signals. A pulse signal train gi(t)=gi(f(t)) for controlling the phase position of the motor is generated in the motor control signal generator to control the phase pattern θ(t) of the motor.

In this method, the rotational phase of the motor is feedback-controlled by the number of pulses. For example, the motor is rotated by 1.8 degrees by one pulse. The direction of rotation is selected from forward and reverse by a direction control signal. The use of this pulse control method enables any acceleration or deceleration pattern (rotation velocity, rotation acceleration) to be controlled at arbitrary phase timing with the phase relationship among two or more motors maintained.

Figure 29:
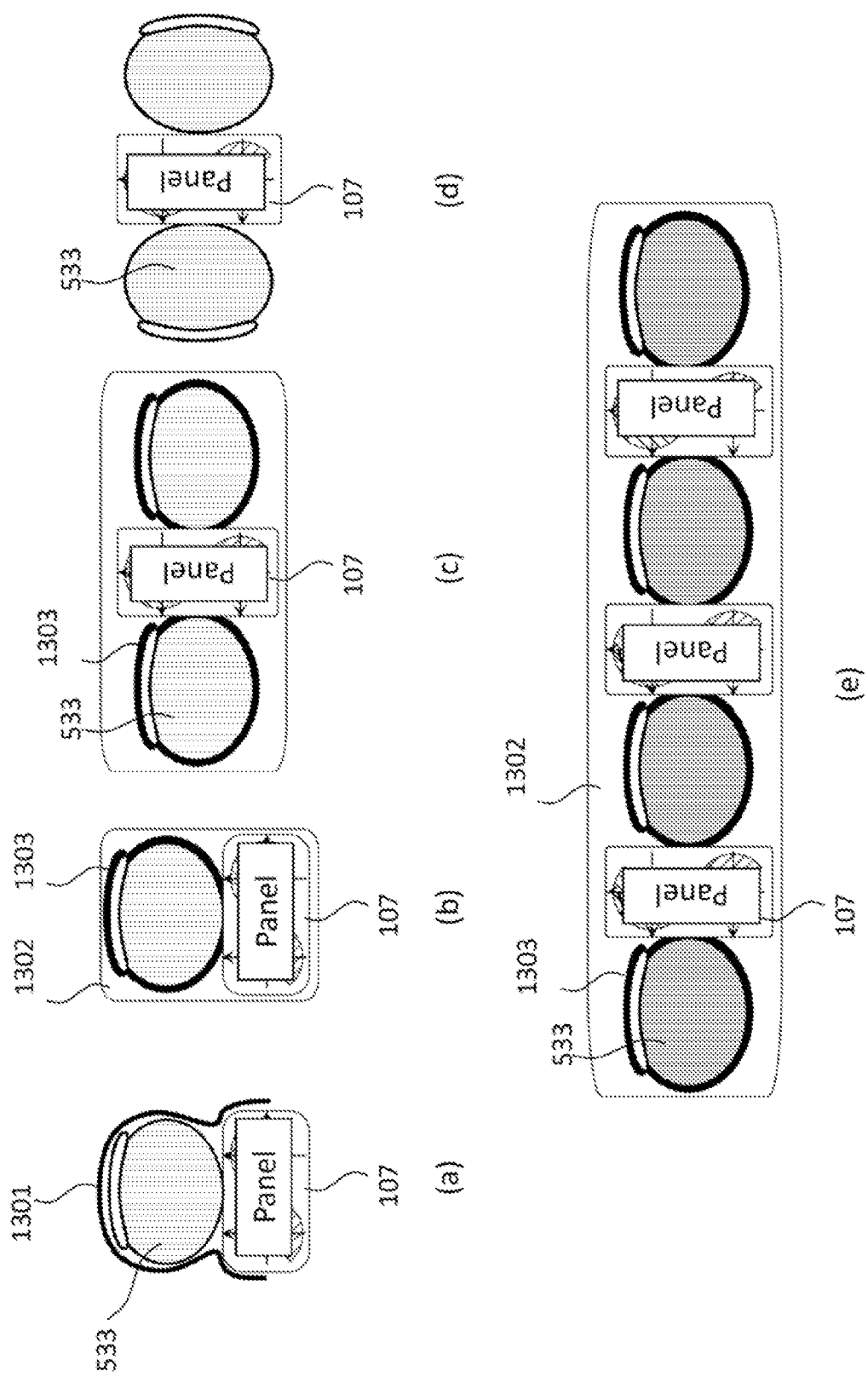
FIG. 29 is are schematic views illustrating some ways of wearing a pseudo-haptic interface device.

FIG. 29 shows an example of implementation of the pseudo-haptic interface device 101.

Figure 30:
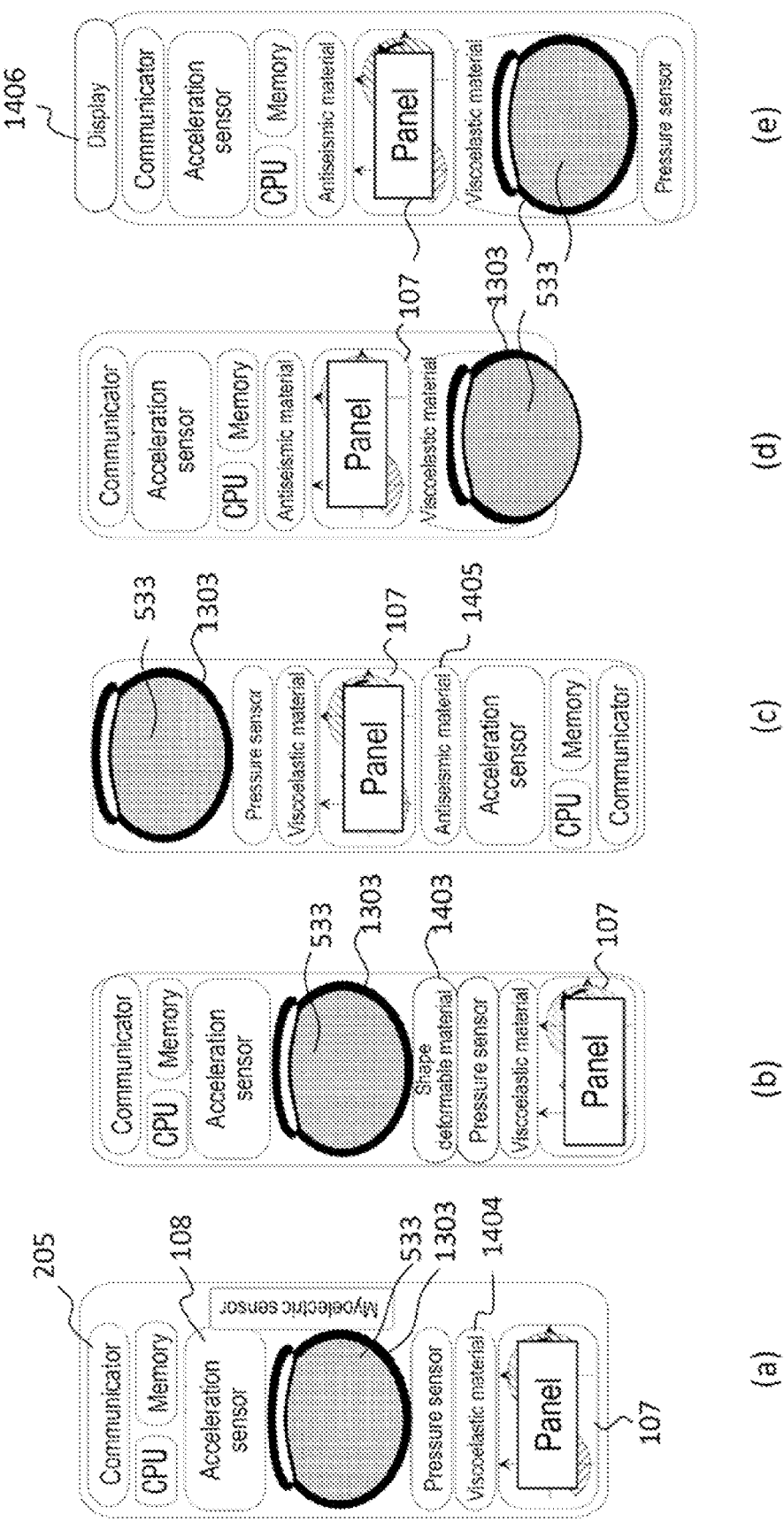
FIG. 30 is schematic views illustrating some ways of wearing the pseudo-haptic interface device.

As shown in FIG. 29a and FIG. 29b, the pseudo-haptic interface device 101 is worn on a finger tip 533 with an adhesive tape 1301 or using a finger insertion portion 1303 of a housing 1302. The pseudo-haptic interface device 101 may be worn between fingers 533 (FIG. 29c) or may be held between fingers 533 (FIG. 29d) while in use. The housing 1302 may be made of a hard material which is not deformed easily, a material which is deformed easily, or a slimy material having viscoelasticity. Possible variations of these ways of wearing are shown in FIG. 30. By controlling the phases of two basic units of the pseudo-haptic device, it is possible to express a swelling sensation and a compressing or oppressing sensation in addition to a force sensation in leftward, rightward, upward and downward directions with a flexible adhesive tape or housing. An item used to mount the pseudo-haptic interface device 101 on the body of the user, such as the adhesive tape or the housing having a finger insertion portion, is referred to as "mounting portion." The mounting portion may be of any form as long as it can be mounted on an object or body. The mounting portion may be in the form of a sheet, belt or tights instead of an adhesive tape or housing having a finger insertion portion as described above. The pseudo-haptic interface device 101 can be mounted in a similar fashion on any part of the body such as finger tip, palm, arm and thigh.

The term "viscoelastic material" and "viscoelastic properties" as used herein referred to as a material having viscosity or elasticity.

FIG. 30 shows other examples of implementation of the pseudo-haptic interface device 101.

In FIG. 30a, a pseudo-haptic device 107 and an acceleration sensor 108 are located on opposite sides with respect to a finger 533 to reduce the influence of vibration on the acceleration sensor 108. Otherwise, the pseudo-haptic device 107 is detected as noise vibration by the acceleration sensor 108. In addition, noise contamination is further reduced by cancelling noise vibration detected by the acceleration sensor 108 based on a control signal from the pseudo-haptic device 107.

In FIG. 30c to FIG. 30e, a vibration absorbing material 1405 is interposed between the pseudo-haptic device 107 and the acceleration sensor 108 to reduce noise vibration contamination.

FIG. 30d shows a pseudo-haptic interface device 101 that enables the user to touch a real object and perceive a pseudo-haptic sensation simultaneously. A pseudo-haptic sensation is added to the feel of a real object. In a conventional data glove, a force sensation is presented by pulling wires attached to fingers to which a haptic sensation is presented. When haptic sensation is presented to fingers on a real object using a data glove, it is difficult to combine the feel of real and virtual objects since the fingers may be separated from the real object or grip may be inhibited. Such problems do not occur in the pseudo-haptic interface device 101. It can provide a combined sensation (mixed reality) which enables the user to feel a virtual touch even when the user holds a real object firmly.

In FIG. 30e, the feel of holding or contacting a real object is altered or converted into the feel of a virtual object 531 by adding a pseudo-haptic sensation based on the degree of contact with the real object and the grip pressure measured by a pressure sensor 110. In FIG. 30f, a shape sensor (such as a photosensor) for measuring a surface shape or changes in shape is used, instead of the pressure sensor shown in FIG. 30e, to measure the shape or surface shape of the held object that relates to its feel and measure the grip force, strain sear force or contact resulting from deformation. As a result, a touch sensation magnifier that emphasizes the measured stress, sear force or surface shape is realized. The user can not only visually recognize the minute surface shape on a display as if he or she is observing it under a microscope but also haptically recognize its shape. In addition, when a photosensor is used as a shape sensor, the user can feel the shape of an object only by laying a hand over it because it can measure the shape of an object in a contactless manner.

In addition, in the case of a variable touch button with a command on a touch panel that changes depending on the status of use or context, in particular, in the case of a variable touch button, such as those of cellular phones, which is hidden by a finger when it is pressed, the command of the variable touch button is hidden and made invisible by a finger. Similarly, when a variable touch button in a virtual space of VR content is pressed, the user becomes unaware of the meaning of the button he or she now wants to press because the menu or command changes depending on the context. Thus, when the meaning of the command on a pseudo-haptic button is displayed on a display 1406 on the pseudo-haptic interface device 101 as shown in FIG. 30e, the user can check it before pressing the button.

To enable the user to operate a virtual object 531 and the pressing information and pressing reaction force from a virtual button of a virtual controller in the same way as a real object without any discomfort, the time lag between the application of a pressing force and the presence of a pressing reaction force becomes a problem. For example, in the case of an arm-shaped grounding-type haptic interface, the position of the holding finger is measured based on the angle of the arm or the like, and stress to be presented is calculated after contact or interference with a digital model is determined. Thereafter, the rotation of the motor is controlled and motion or stress of the arm is presented. Thus, there may occur a response delay. In particular, when the user is playing a game, monitoring and controlling on the content side may lead to delays in response because the user operates buttons reflexively and quickly. In such a case, a CPU and a memory for monitoring the sensors (108, 109, 110) and controlling the pseudo-haptic device 107 and the viscoelastic material 1404 are also equipped in the pseudo-haptic interface device 101 to provide real-time control. This improves the response to pressing of virtual buttons and improves reality and operability.

The pseudo-haptic interface device 101 has a communication device 205 and communicates with other pseudo-haptic interface devices 101. For example, when pseudo-haptic interface devices 101 are mounted on all the fingers and thumb, it is possible to change the shape of a shape-changeable material in each pseudo-haptic interface device (1403 in FIG. 88B) in synchronization with a motion of the corresponding finger or thumb or to enable the user to perceive a change in shape or feel of a virtual controller or operate virtual buttons in real time. This improves reality and operability.

In FIG. 30a, in order to utilize a hysteresis characteristic of a sensation or muscle effectively, a myoelectric reaction is measured with a myoelectric sensor 110 and the pseudo-haptic induction function is corrected in a feedback manner so that the time and intensity of muscle contraction can increase. One factor that affects the induction of a pseudo-haptic sensation is the way of mounting the pseudo-haptic interface device 101 on a finger or palm (the way of pinching or pinching strength) or the user's manner of putting power into the arm that receives a force from the pseudo-haptic interface device 101. Different people have different sensitivities to a pseudo-haptic sensation. Some people feel a pseudo-haptic sensation with high sensitivity when they make a loose fist and some feels a pseudo-haptic sensation with high sensitivity when they make a tight fist. Similarly, the sensitivity changes depending on the tightness with which the pseudo-haptic interface device 101 is worn. To absorb the differences between individuals, the pressure sensor 109 or the myoelectric sensor 110 monitors the user's way of making a fist to measure the individual difference and correct the pseudo-haptic induction function in real time. People get used to physical simulations in content and learn the right way of making a fist. This correction has the effect of promoting it.

While the pseudo-haptic interface device 101 has a large thickness so that the component structure can be seen in FIG. 30a to FIG. 30e, each component may be of a sheet-like flat configuration.

Figure 31:
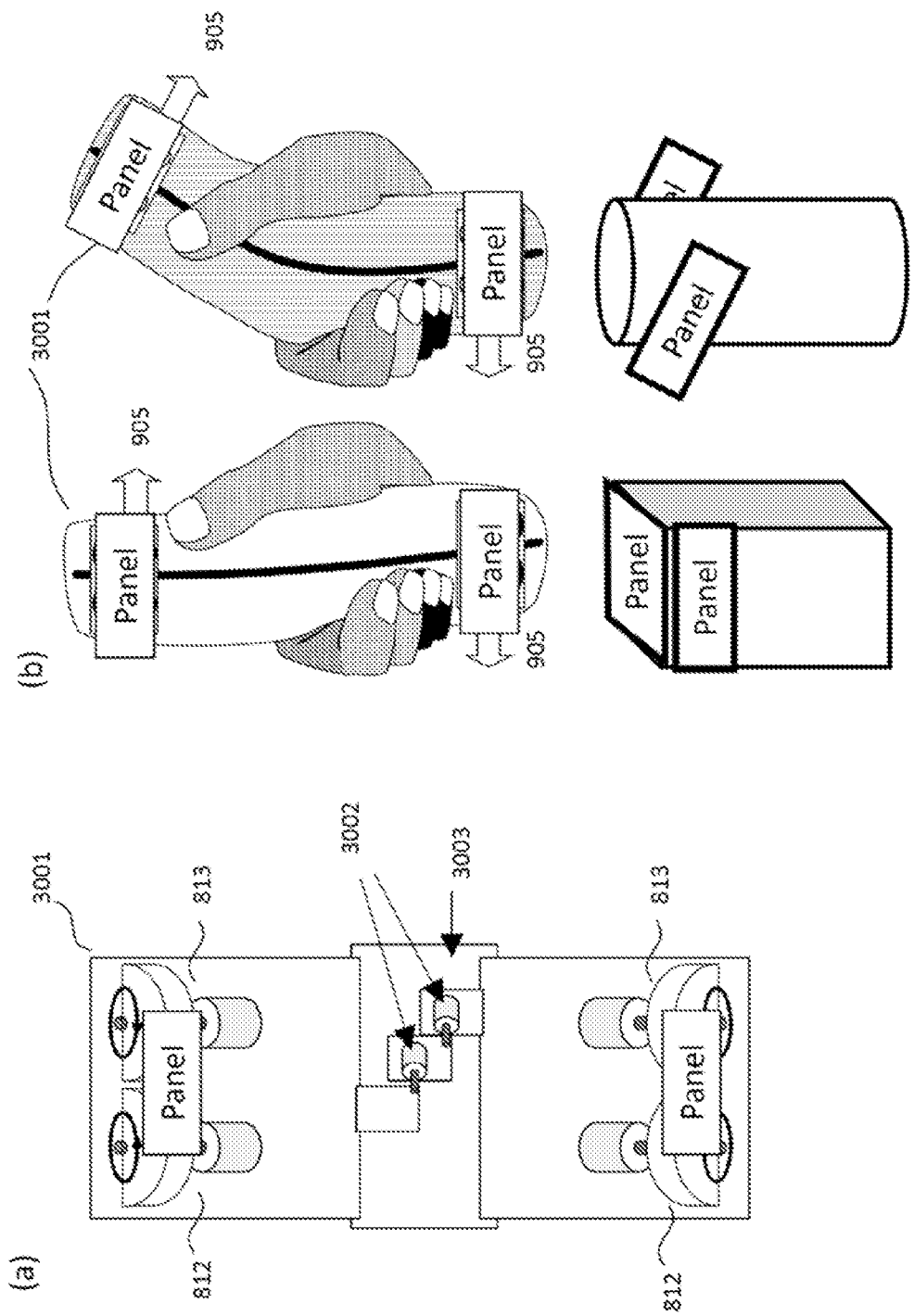
FIG. 31 is schematic views illustrating one way of implementation of the pseudo-haptic interface device.

FIG. 31a shows a device that emphasizes a pseudo-haptic sensation 905 induced by a pseudo-haptic device by changing the shape 3001 of a pseudo-haptic interface device in synchronization with a pseudo-haptic force with shape changing motors 3002 in addition to causing the pseudo-haptic device to induce a pseudo-haptic sensation.

For example, when this is applied to a fishing game as shown in FIG. 31b, the tensile force sensation from the fishing line induced by the pseudo-haptic sensation 905 is enhanced by bending the shape 3001 of the interface backward in synchronization with the fish pulling the fishing rod. At this time, the user cannot experience such a real tug by simply changing the shape of the interface without a pseudo-haptic sensation. The addition of a change in shape of the interface to the pseudo-haptic sensation improves reality. In addition, when basic units of a pseudo-haptic device are spatially arranged as shown in FIG. 31c, a deformation effect can be created without the shape changing motors 3002.

Instead of the shape changing motors 3002, any mechanism that can change a shape, such as a drive unit using a shape-memory alloy or piezoelectric element, may be used to create such a change in shape.

Figure 32:
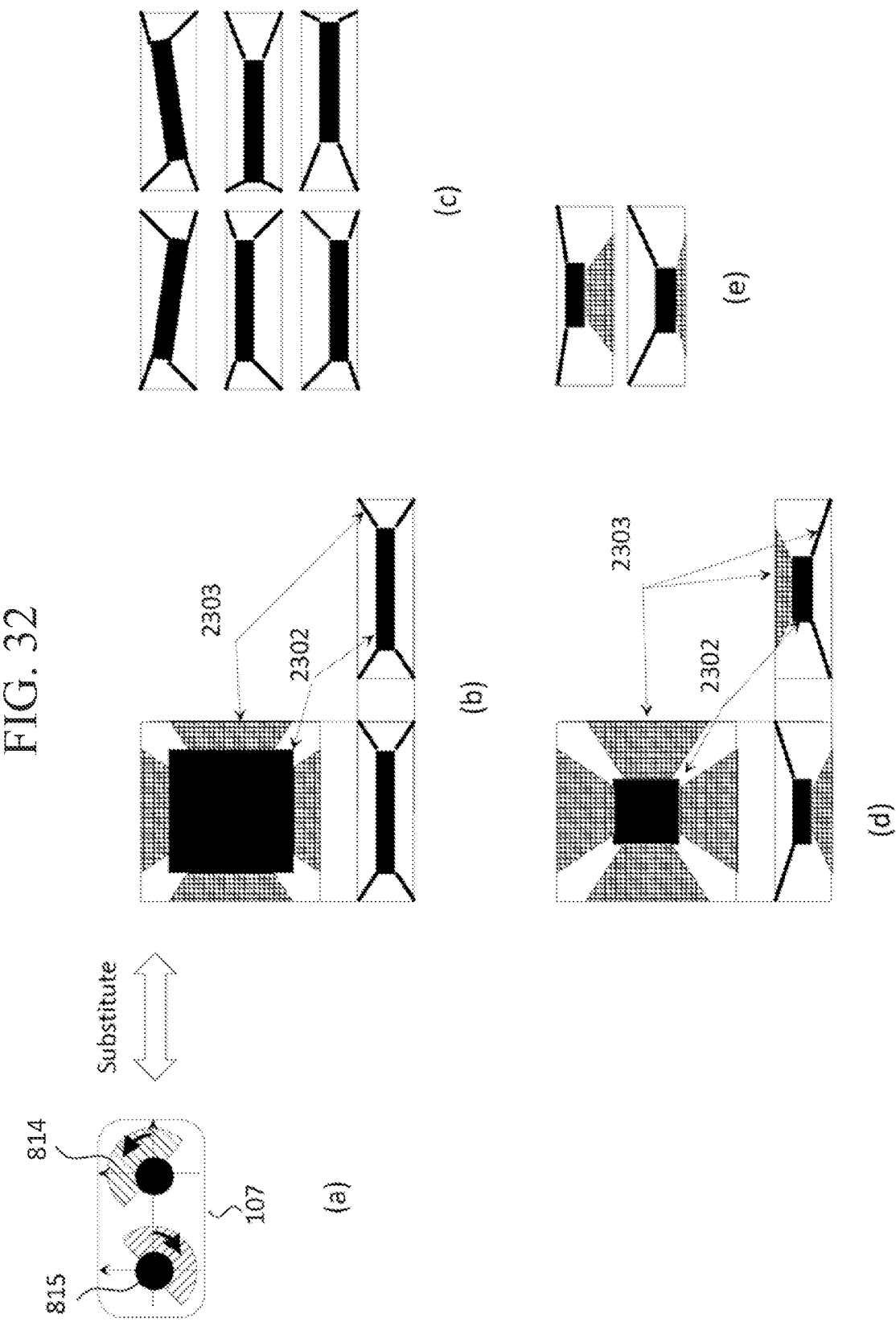
FIG. 32 is schematic views illustrating a method for controlling an actuator.

FIG. 32 shows an alternative device for the pseudo-haptic device 107.

Instead of eccentric weights 814 of the eccentric rotators and the eccentric motor 815 for driving them shown in FIG. 32a, a weight 2302 and extendable members 2303 are used in FIG. 32b to FIG. 32e. For example, FIG. 32b and FIG. 32d show a plan view, a front view and a side view in a case where the weight 2302 is supported by eight extendable members 2303, and show a plan view, a front view and a side view in a case where the weight 2302 is supported by four extendable members 2303. In each drawing, the weight can be moved in an arbitrary direction by extending and contracting paired extendable members 2303. As a result, translational or rotational displacement or vibration can be generated. Any structure having an acceleration-deceleration mechanism that can generate and control a translational movement of the center of gravity or a rotation torque can be used as an alternative.

The use of such a haptic presentation device enables the operator to effectively feel a sense of insertion, a sense of push, a sense of denting, a sense of depth, a sense of being pushed back, a sense of floating, a sense of convergence of vibration or amplitude, a sense of reverberation of vibration or amplitude, a sense of direction of displacement or movement, a sense of sinking, a sense of hardness, a sense of softness or a sense of solidity no matter how small the stimulus generated in a vibration generating part in the haptic presentation device is. In addition, even when such a sensation is not reproduced or presented in a physical sense, the user can sensuously experience such a sensation and a physical response or reflex.

Implementation of the present invention makes it possible to achieve a useful man-machine interface that can be mounted in machines and instruments used in the field of virtual reality, machines and instruments used in the field of game, amusement and entertainment, portable communication devices used in the field of IT, information terminal devices, navigation devices, personal digital assistants, in machines and instruments used in the field of automobile and robot, machines and instruments used in medical and welfare services, machines and instruments used in the field of space technology and so on.

More specifically, in the field of virtual reality or intelligent home appliances, it is possible to provide someone with haptic information such as a haptic sense or texture via a man-machine interface to which the present invention is applied or to present the existence of an object in virtual and real spaces, the impact from a collision or an operational feeling for a device by applying a resisting force or reaction force to limit the movement of someone. When the interface is mounted in a cellular phone, a portable navigation device or the like, various instructions and guidance that were impossible with conventional technology can be provided via the skin of the operator.

Because the interface of the present invention can present various textures, it is applicable to stationery, notebooks, pens, home appliance, advertising displays, signage, kiosk terminals, walls, tables, chairs, massagers, vehicles, robots, wheelchairs, tableware, shakers, simulators (for surgery, driving, massage, sports, walking, musical instruments, crafts, paintings, art) to give added value, such as senses or texture including a sense of insertion, a sense of denting, a sense of depth, a sense of being pushed back, a sense of floating, a sense of convergence, a sense of reverberation, a sense of direction, a sense of sinking, a sense of hardness, a sense of softness, a sense of smoothness, a sense of slipperiness, a sense of greasiness, a sense of sliminess, a sense of sandiness, a sense of unevenness, a sense of prickliness, a sense of stiffness, a sense of solidness or a sense of marshmallowiness, to products.

What is claimed is:

1. A haptic information presenting system, comprising:
a haptic presenting device configured to present haptics to an operator, wherein the haptic presenting device includes at least one of a physical quantity generating device configured to generate a physical quantity for presenting the haptics to the operator or a stimulus quantity generating device configured to generate a stimulus quantity for presenting the haptics to the operator;
a drive device configured to drive the haptic presenting device; and
at least one contact portion configured to be coupled to the physical quantity generating device or the stimulus quantity generating device,
wherein the haptic presenting device has at least two openings including a first opening and a second opening, the first opening is disposed on a first surface of the haptic presenting device, the second opening is disposed on a second surface of the haptic presenting device, the first surface and the second surface are opposing surfaces with respect to the haptic presenting device, and the two openings are configured to present the haptics,
wherein the at least one contact portion is configured to present the haptics to the user through the at least two openings, and
wherein the haptic presenting device is a handheld device or a hand-worn device.

2. The haptic information presenting system according to claim 1, further comprising a haptic non-presenting device that does not present haptics to the operator.

3. The haptic information presenting system according to claim 1, wherein at least one of the physical quantity or the stimulus quantity includes at least one of a position, a velocity, an acceleration, a shape, a displacement, a deformation, an amplitude, a rotation, a vibration, a force, a torque, a pressure, a humidity, a temperature, a viscosity, or an elasticity.

4. The haptic information presenting system according to claim 1, further comprising a haptic presentation separating function, wherein the haptic presentation separating function includes a haptic presentation separating device that at least one of prevents or reduces transmission of at least one of the physical quantity or the stimulus quantity.

5. The haptic information presenting system according to claim 1, wherein at least one of the physical quantity generating device is disposed in a freely movable manner in the haptic presenting device and independently from the haptic presenting device so as to generate the physical quantity or the stimulus quantity generating device is disposed in a freely moveable manner in the haptic presenting device and independently from the haptic presenting device so as to generate the stimulus quantity.

6. The haptic information presenting system according to claim 1, wherein at least one of the physical quantity generating device includes a plurality of physical quantity generating devices or the stimulus quantity generating device includes a plurality of stimulus quantity generating devices.

7. The haptic information presenting system according to claim 1, wherein at least one of the physical quantity generating device or the stimulus quantity generating device includes at least one of a motor, an eccentric motor, an actuator, a piezoelectric element, a piezo element, a speaker, an ultrasonic wave, artificial muscle, a shape-memory alloy, a molecular motor, a static element, a coil, a magnetic force, static electricity, or an electric stimulus.

8. The haptic information presenting system according to claim 1, further comprising a haptic non-presenting device that does not present haptics to the operator, wherein the haptic non-presenting device has a grip section or a fixed section.

9. The haptic information presenting system according to claim 1, further comprising a haptic presentation separating device, wherein the haptic presentation separating device includes at least one of an isolation-function member, a buffer material, rubber, sponge, a spring, or gel.

10. A haptic information presenting system, comprising:
a haptic presenting device configured to present haptics to an operator, wherein the haptic presenting device includes at least one of a physical quantity generating device configured to generate a physical quantity for presenting the haptics to the operator or a stimulus quantity generating device configured to generate a stimulus quantity for presenting the haptics to the operator;
a drive device configured to drive the haptic presenting device; and
at least one contact portion configured to be coupled to the physical quantity generating device or the stimulus quantity generating device,
wherein at least one of the physical quantity generating device is disposed in a freely movable manner in the haptic presenting device and independently from the haptic presenting device so as to generate the physical quantity or the stimulus quantity generating device is disposed in a freely moveable manner in the haptic presenting device and independently from the haptic presenting device so as to generate the stimulus quantity,
wherein the haptic presenting device has at least two openings including a first opening and a second opening, the first opening is disposed on a first surface of the haptic presenting device, the second opening is disposed on a second surface of the haptic presenting device, the first surface and the second surface are opposing surfaces with respect to the haptic presenting device, and the two openings are configured to present the haptics,
wherein the at least one contact portion is configured to present the haptics to the user through the at least two openings, and
wherein the haptic presenting device is a handheld device or a hand-worn device.

11. The haptic information presenting system according to claim 10, further comprising a haptic non-presenting device that does not present haptics to the operator.

12. The haptic information presenting system according to claim 10, wherein at least one of the physical quantity or the stimulus quantity includes at least one of a position, a velocity, an acceleration, a shape, a displacement, a deformation, an amplitude, a rotation, a vibration, a force, a torque, a pressure, a humidity, a temperature, a viscosity, or an elasticity.

13. The haptic information presenting system according to claim 10, further comprising a haptic presentation separating function, wherein the haptic presentation separating function includes a haptic presentation separating device that at least one of prevents or reduces transmission of at least one of the physical quantity or the stimulus quantity.

14. The haptic information presenting system according to claim 10, wherein at least one of the physical quantity generating device includes a plurality of physical quantity generating devices or the stimulus quantity generating device includes a plurality of stimulus quantity generating devices.

15. The haptic information presenting system according to claim 10, wherein at least one of the physical quantity generating device or the stimulus quantity generating device includes at least one of a motor, an eccentric motor, an actuator, a piezoelectric element, a piezo element, a speaker, an ultrasonic wave, artificial muscle, a shape-memory alloy, a molecular motor, a static element, a coil, a magnetic force, static electricity, or an electric stimulus.

16. The haptic information presenting system according to claim 10, further comprising a haptic non-presenting device that does not present a haptic to the operator, wherein the haptic non-presenting device has a grip section or a fixed section.

17. The haptic information presenting system according to claim 10, further comprising a haptic presentation separating device, wherein the haptic presentation separating device comprises at least one of an isolation-function member, a buffer material, rubber, sponge, a spring, or gel.

* * * * *